(12) United States Patent
Suzuki et al.

(10) Patent No.: US 8,106,284 B2
(45) Date of Patent: Jan. 31, 2012

(54) PLAYBACK APPARATUS AND DISPLAY METHOD

(75) Inventors: Shiro Suzuki, Kanagawa (JP); Chisato Kemmochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 395 days.

(21) Appl. No.: 12/498,547

(22) Filed: Jul. 7, 2009

(65) Prior Publication Data

US 2010/0011024 A1 Jan. 14, 2010

(30) Foreign Application Priority Data

Jul. 11, 2008 (JP) ................................. 2008-181037

(51) Int. Cl.
G10H 1/00 (2006.01)
G10H 1/18 (2006.01)
G10H 7/00 (2006.01)

(52) U.S. Cl. ......................................................... 84/615

(58) Field of Classification Search ...................... 84/615
See application file for complete search history.

(56) References Cited

U.S. PATENT DOCUMENTS

| | | | |
|---|---|---|---|
| 5,471,009 A * | 11/1995 | Oba et al. ......................... | 84/645 |
| 5,576,685 A | 11/1996 | Saito | |
| 7,482,530 B2 | 1/2009 | Kobayashi | |
| 7,507,901 B2 | 3/2009 | Kobayashi | |
| 7,813,921 B2 * | 10/2010 | Kobayashi et al. ............ | 704/226 |
| 2004/0244568 A1 * | 12/2004 | Nakabo et al. .................. | 84/615 |
| 2005/0100172 A1 * | 5/2005 | Schliep et al. ............... | 381/71.4 |
| 2005/0129252 A1 * | 6/2005 | Heintzman et al. ............. | 381/58 |
| 2005/0195984 A1 * | 9/2005 | Miura et al. ..................... | 381/63 |
| 2006/0167576 A1 | 7/2006 | Rosenberg | |
| 2009/0249942 A1 * | 10/2009 | Suzuki et al. ................... | 84/602 |

FOREIGN PATENT DOCUMENTS

| | | |
|---|---|---|
| AU | 743455 B2 | 1/2002 |
| EP | 1241588 A | 9/2002 |
| EP | 1791111 A | 5/2007 |
| JP | 06-274164 A | 9/1994 |
| JP | 09-116361 A | 5/1997 |
| JP | 10-207479 A | 8/1998 |
| JP | 2000-059876 A | 2/2000 |

(Continued)

OTHER PUBLICATIONS

Chu et al.: "A Simplified Early Auditory Model with Application in Speech/Music Classification", Canadian Conference on Electrical and Computer Engineering, May 1, 2006; pp. 775-778.

*Primary Examiner* — Jeffrey Donels

(74) *Attorney, Agent, or Firm* — Wolf, Greenfield & Sacks, P.C.

(57) ABSTRACT

A playback apparatus is able to present song categories to the user that are suited to the current environmental noise. An audio pickup picks up noise data of the surrounding environment. A noise analyzer analyzes the noise data, and then extracts characteristic quantities expressing the characteristics of the noise data. A noise categorizer categorizes the noise data on the basis of the extracted noise data characteristic quantities. A content category database stores content data recorded onto a recording medium in association with categories based on characteristic quantities of the content data. A content category selector cross-references the noise data categorization result with the content category database, and on the basis thereof, selects a plurality of content data categories from among the categorized content data recorded onto the recording medium. A display unit then displays the selected plurality of content data categories.

19 Claims, 23 Drawing Sheets

FOREIGN PATENT DOCUMENTS

| | | |
|---|---|---|
| JP | 2001-188599 A | 7/2001 |
| JP | 2003-244785 A | 8/2003 |
| JP | 2004-236245 A | 8/2004 |
| JP | 2004-335065 A | 11/2004 |
| JP | 2005-031644 A | 2/2005 |
| JP | 2005-274708 | 10/2005 |
| JP | 2005-275068 | 10/2005 |
| JP | 2006-301890 A | 11/2006 |
| JP | 2006-311395 A | 11/2006 |
| JP | 2007-041979 A | 2/2007 |
| JP | 2007-097087 A | 4/2007 |
| JP | 2007-266803 A | 10/2007 |
| JP | 2008-123576 A | 5/2008 |
| WO | WO 2007/010481 A | 1/2007 |

* cited by examiner

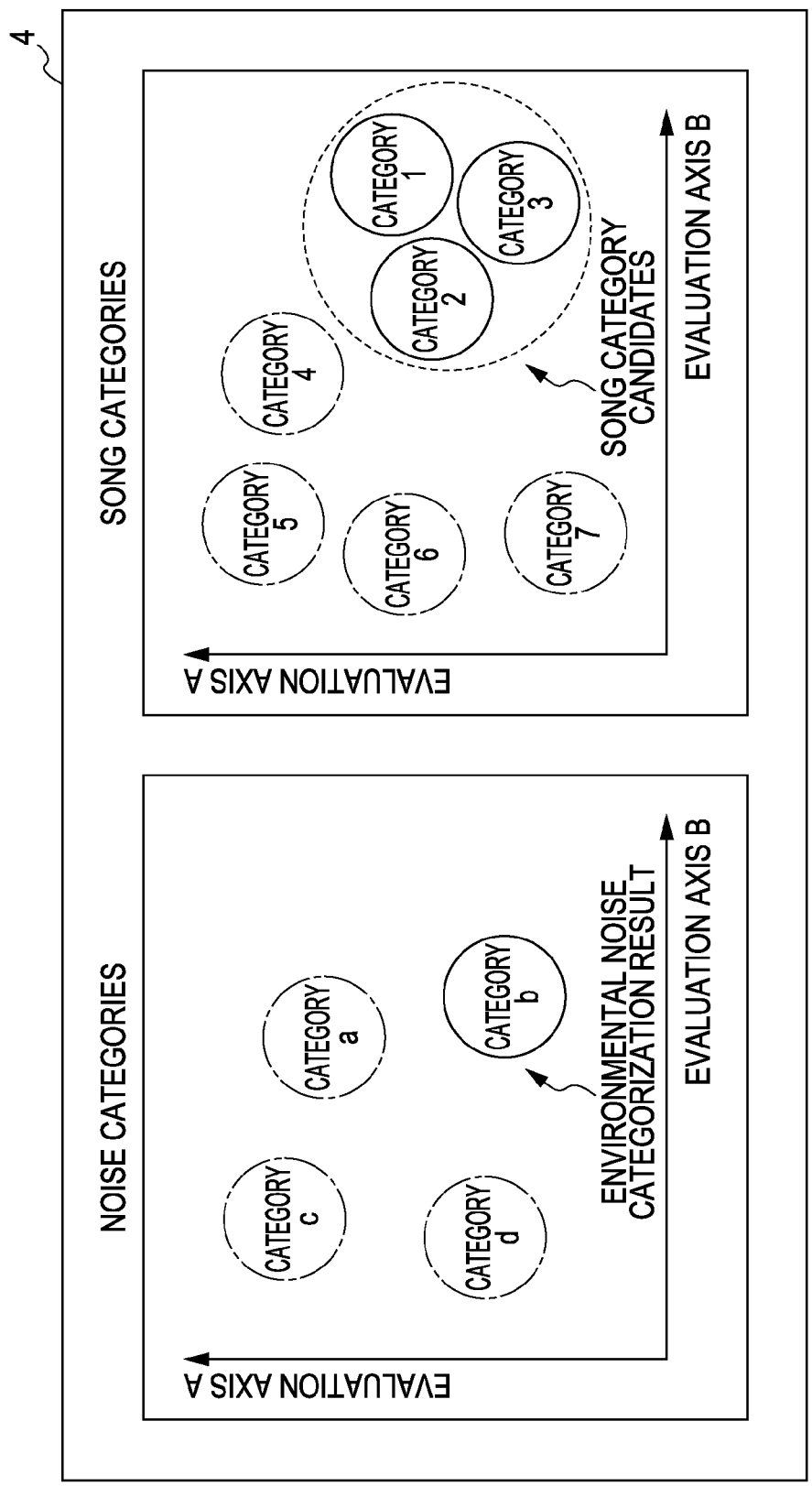

| CATEGORY NAME | PLAYBACK FREQUENCY |
|---|---|
| CATEGORY 1 | ☆☆☆☆☆ |
| CATEGORY 2 | ☆☆☆☆ |
| CATEGORY 3 | ☆ |
| CATEGORY 4 | ☆☆ |
| CATEGORY 5 | ☆☆☆ |
| ⋮ | ⋮ |

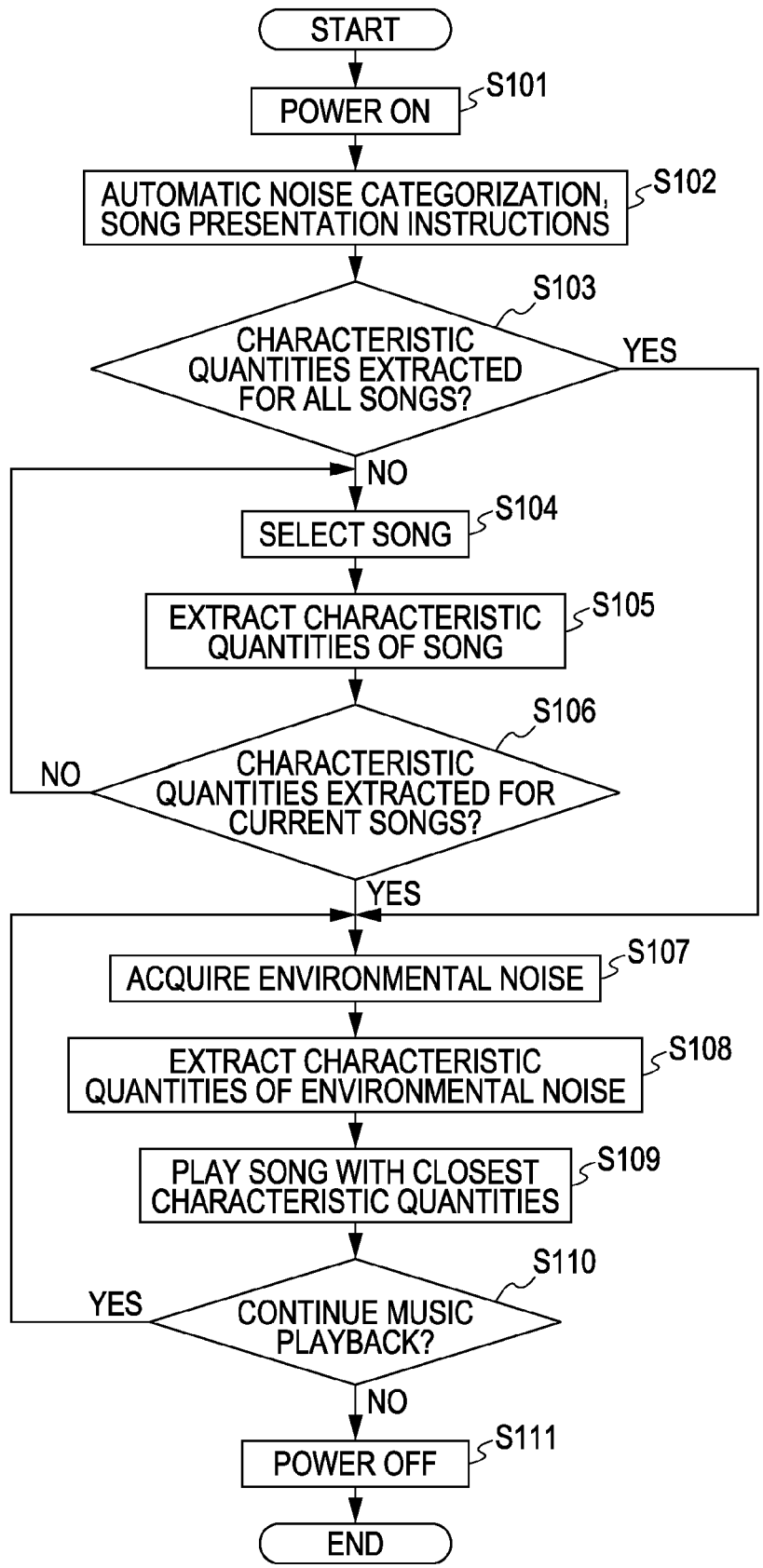

PLAYBACK APPARATUS AND DISPLAY METHOD

BACKGROUND OF THE INVENTION

1. Field of the Invention

The present invention relates to a playback apparatus that presents songs suited to the current environmental noise, and to a display method for such a playback apparatus.

2. Description of the Related Art

Certain playback apparatus have become commercially viable in recent years, wherein songs are automatically categorized into various categories, and as a result of the user selecting a particular category, songs corresponding to the selected category are automatically selected and played back. In such playback apparatus, a song categorization method is used wherein characteristic quantities, such as the song tempo and chord progression, are detected for each song, and the songs are then automatically categorized into various categories on the basis of the detected characteristic quantities.

For example, Japanese Unexamined Patent Application Publication No. 2005-274708 discloses a method whereby a song is analyzed, and characteristic quantities, such as the tempo and perceived speed, are detected. As another example, Japanese Unexamined Patent Application Publication No. 2005-275068 discloses a method whereby the signal components of each pitch in an audio signal are analyzed.

Meanwhile, portable playback apparatus able to play songs outside the home and outdoors have also come into widespread use recently. Such portable playback apparatus are also capable of automatically categorizing songs using the song categorization methods described above. For example, a portable playback apparatus may be configured such that when a particular category is selected by the user, the portable playback apparatus plays songs corresponding to the selected category.

However, since such portable playback apparatus can be used in a variety of environments, the environmental noise state may differ depending on surrounding conditions. In other words, the surrounding environmental noise level differs depending on the environment. For this reason, a song category selected by the user may not be suited to the current environmental noise.

In addition, the surrounding environmental noise may change, such as when using a playback apparatus to listen to songs while moving. For this reason, even if a song category suited to the surrounding environmental noise is selected when initially listening to songs, the surrounding environmental noise may change as a result of the user moving, and the selected song category may be unsuited to the current environmental noise at the destination.

In order to solve such problems, a playback apparatus able to automatically select and play songs suited to the environmental noise has been proposed. In such a playback apparatus, characteristic quantities like those described above are respectively extracted for both the environmental noise and the songs, and then particular songs are automatically selected on the basis of the respectively detected characteristic quantities.

FIG. 22 illustrates an exemplary usage of a playback apparatus 101 of the related art. In the example shown in FIG. 22, a microphone 103 (also referred to hereinafter as a mike 103) and headphones 102 are connected to a portable playback apparatus or similar playback apparatus 101, whereby the user is listening to songs recorded onto the playback apparatus 101 via the headphones 102. The mike 103 is built into the headphones 102, for example, and picks up the environmental noise heard at the position of the user's ears when the headphones 102 are worn.

The playback apparatus 101 conducts predetermined analysis of the environmental noise picked up by the mike 103, and extracts characteristic quantities therefrom. In addition, the playback apparatus 101 also conducts predetermined analysis of the songs recorded onto the playback apparatus 101 and extracts characteristic quantities therefrom, using the same characteristic quantity extraction method as that used for the environmental noise. Subsequently, the playback apparatus 101 compares the characteristic quantities of the environmental noise to the characteristic quantities of the songs, and then automatically selects the songs that are easiest to hear given the current environmental noise.

The method for automatically selecting songs suited to the current environmental noise may, for example, involve extracting a plurality of types of characteristic quantities from both the environmental noise and the songs, and then selecting songs on the basis of the extracted characteristic quantities such that the characteristic quantities for both the environmental noise and the songs are mutually similar. For example, FIG. 23 illustrates exemplary categorization results for environmental noise and a song categorized on the basis of two different characteristic quantities respectively extracted from the environmental noise and the song.

As shown in FIG. 23, on the basis of their respective characteristic quantities, the environmental noise and the song are mapped onto a two-dimensional plane defined by two evaluation axes A and B, which represent the two characteristic quantities. In this case, FIG. 23 shows that the categories of the environmental noise and the song have similar characteristics to the degree that the positions (i.e., the distances) between individually mapped categories are near to each other.

As an easily understood practical example, consider that lively rock music is easy to hear in loud environments, and slow classical music is easy to hear in quiet environments. In other words, if the noise and the song are similar, then there is a higher probability that the song will not be masked by the noise, and thus be easy to hear. It can be intuitively understood that slow classical music is hard to hear in loud environments; this is because the characteristic quantities of the noise and the song differ significantly. In contrast, rock music is not particularly hard to hear in quiet environments, and thus a significant difference in the characteristic quantities of noise and song might not result in the song being hard to hear. However, in this case, there is a problem in that sound leakage from the headphones might be a nuisance to surrounding persons.

In other words, if it is assumed that a song category having characteristics similar to those of the current environmental noise is easy to hear given such noise, then the song categories that are close to the mapped position of the current environmental noise are easy-to-hear song categories. Consequently, if the current environmental noise is categorized into "Category b", for example, then song categories categorized into "Category 2" are selected from among the song categories mapped into the categories from "Category 1" to "Category 7", since "Category 2" is mapped to the position closest to the position of "Category b".

It should be appreciated that song categories having characteristics similar to those of particular environmental noise are not limited to being easy-to-hear song categories given such noise. The correspondence between noise and song as well as the selection method may also be changed, depending on the types of characteristic quantities used as the evaluation axes. However, in order to simplify explanation, song categories having characteristics similar to those of the current environmental noise are herein described as being song categories that are easy to hear given such environmental noise.

A process flow for a song selection method of the related art will now be summarized with reference to the flowchart shown in FIG. 24. In step S101, the playback apparatus 101 is powered on. If instructions to play songs according to the surrounding environmental noise are issued in step S102, then in step S103, it is determined whether or not characteristic quantities have been extracted for all songs recorded onto the playback apparatus 101. If it is determined that characteristic quantities have not been extracted for all songs, then the process transitions to step S104, and a song for characteristic quantity extraction is selected. In contrast, if it is determined that characteristic quantities have been extracted for all songs, then the process transitions to step S107.

In step S105, the characteristic quantities of the selected song are extracted. In step S106, it is determined whether or not characteristic quantities have been extracted for all songs targeted for characteristic quantity extraction. If it is determined that characteristic quantities have been extracted for all songs, then the process transitions to step S107. In contrast, if it is determined that characteristic quantities have not been extracted for all songs targeted for characteristic quantity extraction, then the process transitions to step S104, and another song is selected for characteristic quantity extraction.

Next, in step S107, environmental noise is picked up via the mike 103, and in step S108, the characteristic quantities of the environmental noise thus picked up are extracted. In step S109, the characteristic quantities of the environmental noise are compared to the characteristic quantities of the songs. Subsequently, the song category having characteristic quantities closest to those of the environmental noise is selected as the easy-to-hear song category given the current environmental noise, and songs categorized into the selected song category are then played back.

In step S110, it is determined whether or not to continue music playback. If it is determined that music playback is to be continued, then the process returns to step S107, and environmental noise pickup is again conducted via the mike 103. In contrast, if it is determined that music playback is not to be continued, then the process transitions to step S111, the playback apparatus 101 is powered off by the user, and the above series of processes is terminated.

In this way, a playback apparatus 101 of the related art is configured to extract characteristic quantities from both environmental noise and songs, and on the basis of the respectively extracted characteristic quantities, automatically select and play back songs that are easy to hear given the current environmental noise.

SUMMARY OF THE INVENTION

Meanwhile, the song selection method used in playback apparatus such as the above is designed to use a predetermined algorithm, and is provided to the user after having been incorporated into the playback apparatus at the manufacturing stage. For this reason, it might not be feasible to switch algorithms or other features of the song selection method incorporated into the playback apparatus according to the user's own preferences.

In other words, although a song automatically selected by the song selection method might be satisfactory for a large number of users in a large number of situations, the song might not be satisfactory for all users in all situations. For this reason, it is desirable to configure a playback apparatus such that the user is ultimately able to individually select songs that he or she wants to hear.

Consequently, the present invention provides a playback apparatus able to present songs to the user that are better suited to the current environmental noise than those of the related art, as well as a display method for the playback apparatus.

A playback apparatus in accordance with an embodiment of the present invention that solves the foregoing problems is provided with the following: an audio pickup configured to pick up noise data of the surrounding environment; a noise analyzer configured to analyze the noise data picked up by the audio pickup, and then extract characteristic quantities expressing the characteristics of the noise data; a noise categorizer configured to categorize the noise data on the basis of the extracted noise data characteristic quantities; a content category database configured to store content data recorded onto a recording medium in association with categories based on characteristic quantities of the content data; a content category selector configured to cross-reference the noise data categorization result with the content category database, and on the basis thereof, select a plurality of content data categories from among the categorized content data recorded onto the recording medium; and a display unit configured to display the selected plurality of content data categories.

A display method for a playback apparatus in accordance with an embodiment of the present invention includes the steps of: picking up noise data of the surrounding environment; analyzing the noise data picked up in the pickup step, and then extracting characteristic quantities expressing the characteristics of the noise data; categorizing the noise data on the basis of the extracted noise data characteristic quantities; cross-referencing the noise data categorization result with a content category database that stores content data recorded onto a recording medium in association with categories based on characteristic quantities of the content data, and on the basis thereof, selecting a plurality of content data categories from among the categorized content data recorded onto the recording medium; and displaying the selected plurality of content data categories on a display unit.

As described above, in the embodiments of the present invention, noise data of the surrounding environment is picked up, analyzed, and then characteristic quantities expressing the characteristics of the noise data are extracted therefrom. The noise data is then categorized on the basis of the extracted noise data characteristic quantities. The noise data categorization result is then cross-referenced with a content category database that stores content data recorded onto a recording medium in association with categories based on characteristic quantities of the content data, and on the basis thereof, a plurality of content data categories are selected from among the categorized content data recorded onto the recording medium. The selected plurality of content data categories is then displayed on a display unit. As a result of such a configuration, content suited to the current environmental noise is selected.

Thus, according to an embodiment of the present invention, content data categories suited to the current environmental noise can be presented to the user.

BRIEF DESCRIPTION OF THE DRAWINGS

FIG. 2 is a diagram for explaining the display shown by a display unit;

FIG. 24 is a flowchart for explaining a song selection method in a playback apparatus of the related art.

DESCRIPTION OF THE PREFERRED EMBODIMENTS

Hereinafter, a first embodiment of the present invention will be described with reference to the accompanying drawings. In the first embodiment of the present invention, characteristic quantities are extracted from both environmental noise and content, and the environmental noise and content are then categorized on the basis of the respectively extracted characteristic quantities. Subsequently, on the basis of the categorization results for the current environmental noise, a plurality of content category candidates suited to the current environmental noise is selected. The state of the current environmental noise and the selected content category candidates are then displayed.

Figure 1:
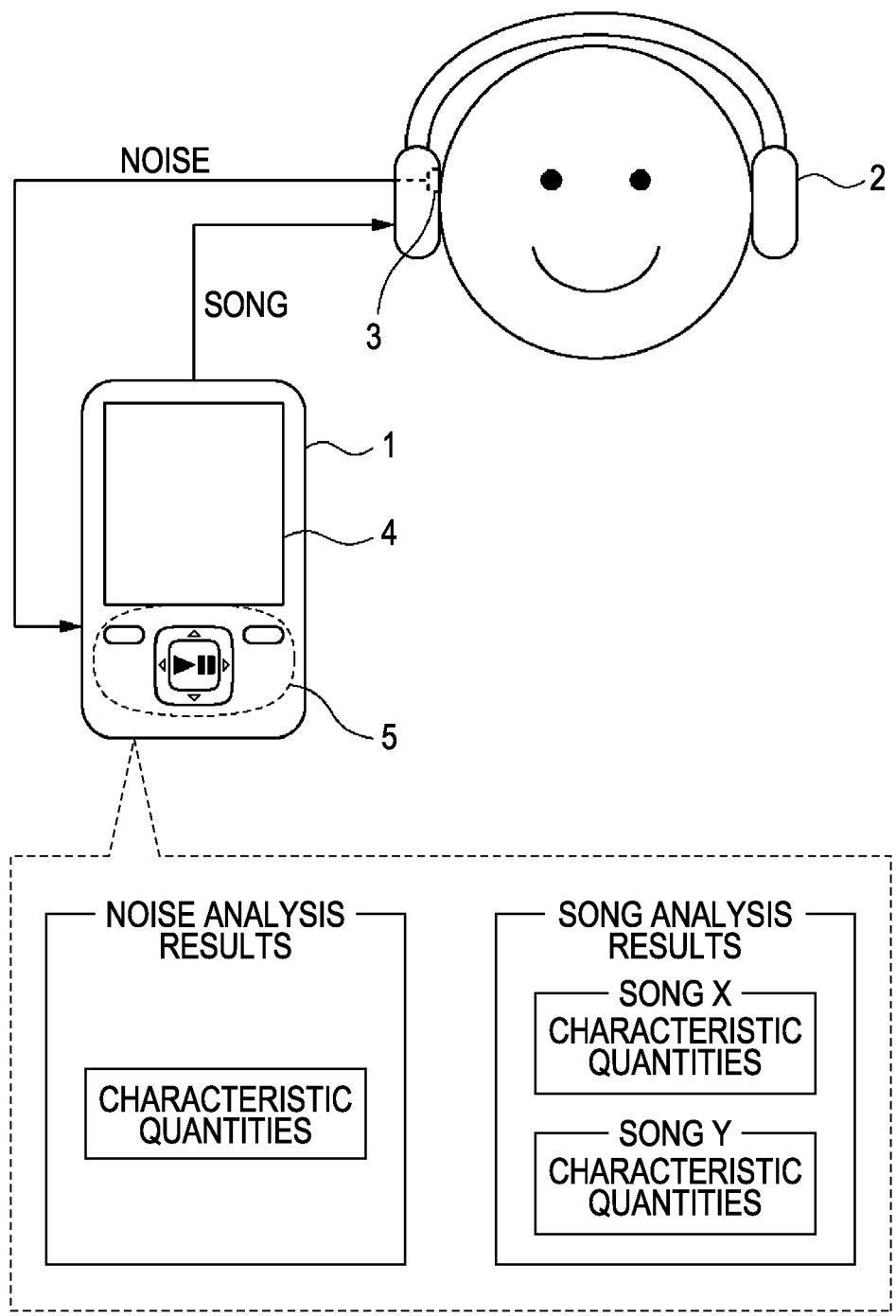
FIG. 1 is a diagram illustrating an exemplary usage of a playback apparatus to which the first embodiment of the present invention can be applied.

FIG. 1 is a diagram illustrating an exemplary usage of a playback apparatus to which the first embodiment of the present invention can be applied. In the example shown in FIG. 1, headphones 2 and a microphone 3 (also referred to hereinafter as a mike 103) are connected to a portable playback apparatus or similar playback apparatus 1. Via the headphones 2, the user listens to content in the form of songs recorded onto the playback apparatus 1. The mike 3 is built into the headphones 2, for example, and picks up the environmental noise heard at the position of the user's ears when the headphones 2 are worn. The mike 3 may also be provided as an external component of the headphones 2, or as part of the playback apparatus 1.

The playback apparatus 1 is provided with a display unit 4, which displays various menus or other components, as well as song-related information such as the title and playback time of the song now playing. When instructions to present song categories in accordance with the environmental noise are issued by the user, the environmental noise categorization result and song category candidates that are easy to hear given the current environmental noise are displayed. In addition, the playback apparatus 1 is also provided with a user interface unit 5, whereby the user is able to perform various operations such as playing, stopping, and selecting songs.

When the user operates the user interface unit 5 and issues instructions to the playback apparatus 1 to present song categories in accordance with the environmental noise, the playback apparatus 1 analyzes environmental noise picked up by the mike 3, and then extracts characteristic quantities expressing the characteristics of the environmental noise. Subsequently, on the basis of the extracted characteristic quantities, the current environmental noise is categorized into an environment, such as "Train" or "Cafe", for example. In addition, the playback apparatus 1 also conducts predetermined analysis of songs recorded onto the playback apparatus 1 using the same analysis method used for analysis of the environmental noise, for example, and thereby extracts characteristic quantities expressing the characteristics of the songs. Subsequently, on the basis of the extracted characteristic quantities, the songs are categorized into categories, such as "Rock", "Jazz", and "Classical", for example. It should be appreciated that a method of the related art may be used as the method for analyzing both the environmental noise and the songs, and thus further description thereof is omitted herein.

On the basis of the categorization result for the environmental noise categorized as described above, the playback apparatus 1 selects a plurality of song category candidates that are easy to hear given the current environmental noise. The playback apparatus 1 then causes the display unit 4 to display both the categorization result of the current environmental noise and the selected song category candidates.

As shown by way of example in FIG. 2, the display unit 4 displays the environmental noise categorization result, as well as selectable song category candidates based on the environmental noise categorization result. Further details of the display shown by the display unit 4 will be later described. At this point, the song category candidates displayed by the display unit 4 are selectable by means of the user operating the user interface unit 5. As a result of the user operating the user interface unit 5 and selecting a desired song category from among the song category candidates displayed by the display unit 4, songs categorized into the selected song category are played back.

The characteristic quantities of the environmental noise and the songs will now be described. Noise heard from the surrounding environment respectively differs according to the particular environment, such as when riding a train or bus, or when in a cafe. Such environmental noise has characteristics that differ depending on the environment. For example, low-range power in the audio frequency band might be large in one particular environment, while high-range power might be large in another environment.

Figure 3A:
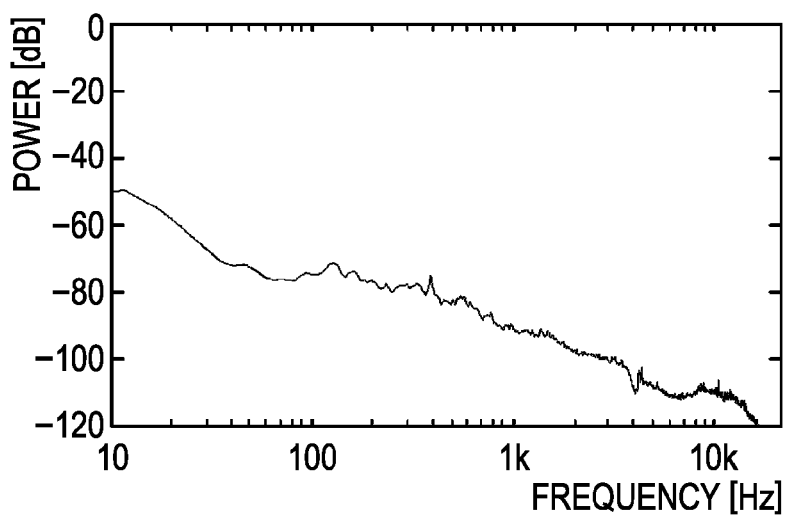
FIG. 3A is a graph illustrating exemplary frequency characteristics of environmental noise.
Figure 3B:
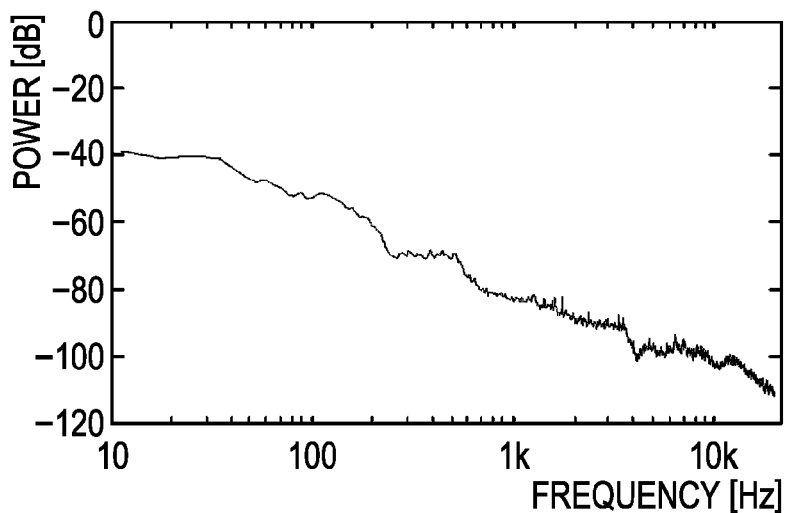
FIG. 3B is a graph illustrating exemplary frequency characteristics of environmental noise.
Figure 3C:
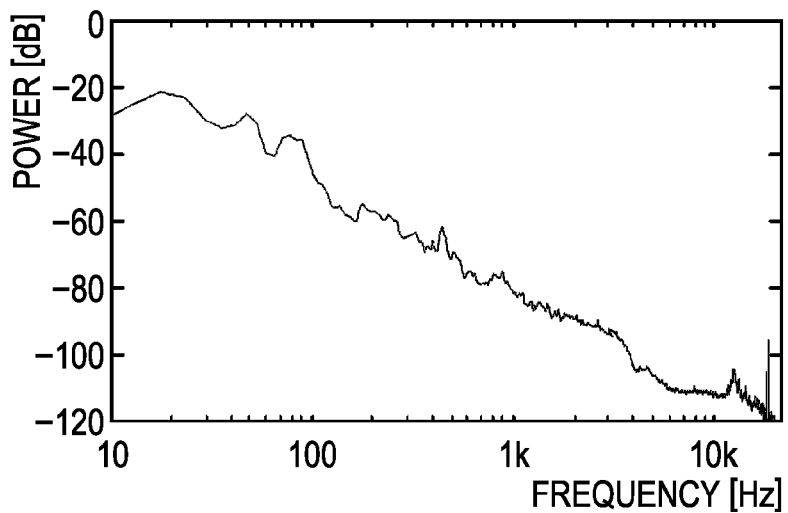
FIG. 3C is a graph illustrating exemplary frequency characteristics of environmental noise.

FIGS. 3A, 3B, and 3C illustrate examples of frequency characteristics for environmental noise picked up in a cafe, a train, and a bus, respectively. The present examples illustrate the frequency characteristics obtained by applying an FFT (fast Fourier transform) to 0.5 sec of environmental noise data picked up as above. In FIGS. 3A to 3C, the horizontal axis expresses frequency (Hz), while the vertical axis expresses power (dB). From FIGS. 3A to 3C it can thus be seen that the power values for respective frequencies largely differ in various environments. Consequently, by extracting such characteristics, the type of environment in which the user is present can be determined.

In frequency analysis by FFT, if the number of samples of time data to be analyzed is taken to be x, then the number of frequency data components obtained as power components becomes x/2. At this point, the frequency resolution may be increased to increase the accuracy of the environmental noise analysis. In order to do so, the sample size is set to a somewhat large value. For example, given 32768 samples of time data, the number of obtained frequency data components becomes 16384.

Given the environmental noise frequency characteristics obtained as described above, it is conceivable that the data for each frequency may be used as characteristic quantities, for example. However, the use of 16384 frequency data components as characteristic quantities for environmental noise results in a massive amount of data, and thus involves significant processing time. Furthermore, since time variation of the frequency data also becomes large, the above is not practical.

Figure 4A:
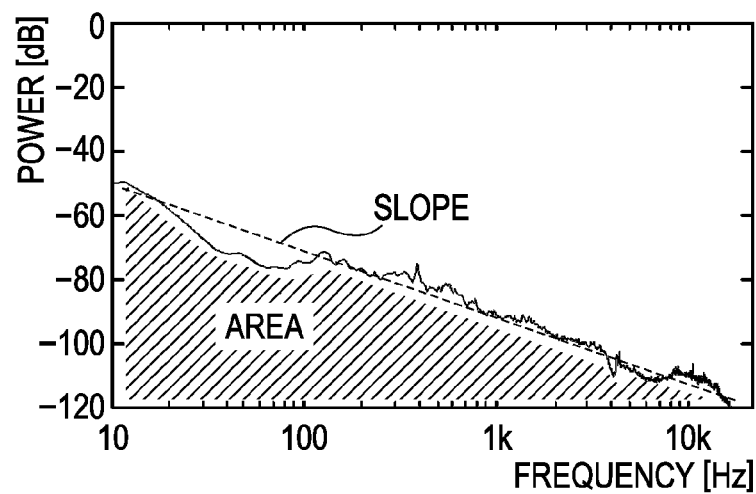
FIG. 4A is a graph for explaining a characteristic quantity of environmental noise.
Figure 4B:
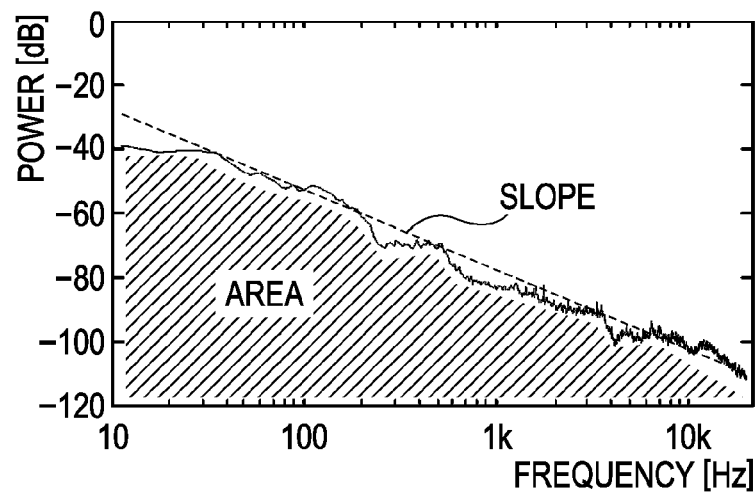
FIG. 4B is a graph for explaining a characteristic quantity of environmental noise.
Figure 4C:
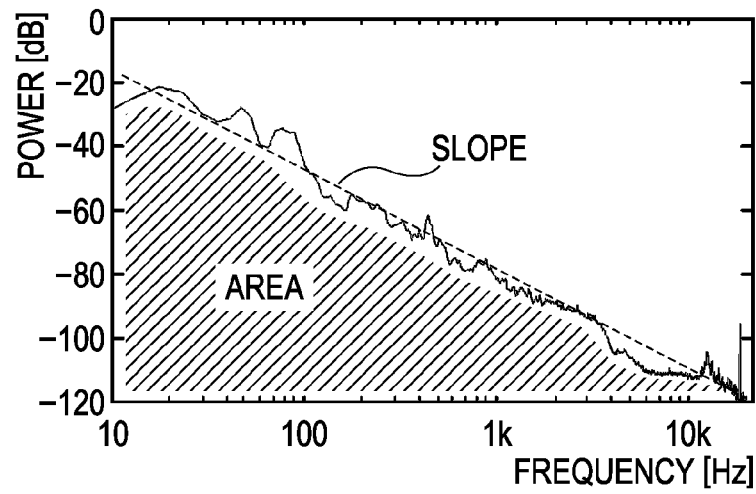
FIG. 4C is a graph for explaining a characteristic quantity of environmental noise.

Consequently, given the frequency data for respective environments as shown by way of example in FIGS. 4A, 4B, and 4C, the envelope slope (indicated by the broken line in FIGS. 4A to 4C) as well as the area enclosed by the envelope (the shaded portion in FIGS. 4A to 4C) are regarded instead. For example, when in a vehicle such as a train or bus, low-range power is greater than that of a cafe. For this reason, it can be determined that the frequency characteristics of noise in a vehicle such as a train or bus will exhibit a larger envelope slope and a larger area enclosed by the envelope compared to the frequency characteristics of noise in a cafe.

Consequently, in the first embodiment of the present invention, the envelope slope as well as the total power expressed by the area enclosed by the envelope in the frequency range of the environmental noise are computed as characteristic quantities of the environmental noise. Subsequently, the environmental noise is categorized on the basis of the computed characteristic quantities.

Similarly to the environmental noise, songs also have characteristics that differ for particular categories. For example, one song might exhibit large low-range power, while another song might exhibit large mid-range power. For this reason, by extracting such characteristics, the categories to which songs for playback belong can be determined.

Consequently, in the first embodiment of the present invention, the envelope slope as well as the total power expressed by the area enclosed by the envelope in the frequency range of a given song are computed as characteristic quantities of that song, similarly to the characteristic quantities of the environmental noise. Subsequently, the song is categorized on the basis of the computed characteristic quantities.

It should be appreciated that the characteristic quantities extracted from both the environmental noise and the songs are not limited not the examples described above, and that information obtained by a variety of analyses may be used as characteristic quantities. For example, it is also possible to use information such as the average volume, frequency spectrum, auto-correlation coefficient, frequency tolerance, power, transient characteristics, sharpness, loudness, spectral center, Mel-frequency cepstral coefficients (MFCCs), perceived loudness (sone), and cepstrum as characteristic quantities.

Furthermore, the time-axis data may be subdivided at every instance of a fixed sample size (e.g., for every N samples, referred to as frames), with characteristic quantities being extracted for each frame unit. A value obtained by taking the ratio or difference between the characteristic quantities of adjacent frames may then used as a characteristic quantity. In addition, an average or distribution obtained by using the characteristic quantities of several frames may also be used as a characteristic quantity.

A method for selecting song categories suited to the current environmental noise on the basis of characteristic quantities for both environmental noise and songs computed as described above will now be described with reference to FIG. 5. The present example describes the case wherein analysis of the environmental noise involves analyzing the envelope and power in the frequency range of the environmental noise, and then computing the analysis results as characteristic quantities of the environmental noise.

Noise data NT for environmental noise that is picked up by the mike 3 is first supplied to a characteristic quantity extractor 21. The characteristic quantity extractor 21 extracts characteristic quantities from the supplied noise data NT, and then supplies the extracted characteristic quantities to a noise categorizer 22. The characteristic quantity extractor 21 may include a frequency analyzer 31, a envelope analyzer 32, and a power analyzer 33, for example.

The noise data NT supplied to the characteristic quantity extractor 21 is first supplied to the frequency analyzer 31. The frequency analyzer 31 takes input noise data NT of a predetermined duration (such as noise data having a time length of approximately 0.5 sec, for example) and performs FFT analysis, octave analysis, or other frequency analysis with respect thereto, thereby acquiring frequency information NS. The frequency information NS thus acquired is then supplied to the envelope analyzer 32 and the power analyzer 33.

The envelope analyzer 32 analyzes the envelope in the frequency range of the noise data NT on the basis of the input frequency information NS. For example, the envelope analyzer 32 may extract envelope information NPe, wherein the envelope in a given frequency band has been digitized in a predetermined manner. In the present example, the value of the envelope slope is used as the envelope information NPe. The extracted envelope information NPe is then supplied to the noise categorizer 22.

The power analyzer 33 analyzes the power in the frequency range of the noise data NT on the basis of the frequency information NS. For example, the power analyzer 33 may extract power information NPp, wherein the power in a given frequency band has been digitized in a predetermined manner. In the present example, the area of the portion enclosed by the envelope in a given frequency band (i.e., the value of the total power in a given frequency band) is used as the power information NPp. The extracted power information NPp is then supplied to the noise categorizer 22.

On the basis of the envelope information NPe supplied from the envelope analyzer 32 as well as the power information NPp supplied from the power analyzer 33, the noise categorizer 22 categorizes the environmental noise by cross-referencing with a characteristic noise quantity database 23. Subsequently, the noise categorizer 22 generates noise category information expressing the categorization result. The noise category information thus generated is then supplied to a song category selector 28.

The characteristic noise quantity database 23 is a database when categorizing noise data by environment on the basis of characteristic quantities extracted from noise data in various environments. In the present example, envelope information NPe and power information NPp are used as the characteristic quantities of the environmental noise. On the basis of the above characteristic quantities, the environmental noise subject to comparison is categorized. For example, the environmental noise might be categorized as "Train" or "Cafe" on the basis of the characteristic noise quantity database 23.

Meanwhile, song data MT for songs recorded onto the playback apparatus 1 is supplied to a characteristic quantity extractor 24. The characteristic quantity extractor 24 extracts characteristic quantities from the supplied song data MT, and then supplies the extracted characteristic quantities to a song categorizer 25. The characteristic quantity extractor 24 may include a frequency analyzer 34, a envelope analyzer 35, and a power analyzer 36, for example.

The song data MT supplied to the characteristic quantity extractor 24 is first supplied to the frequency analyzer 34. The frequency analyzer 34 takes input song data MT of a predetermined duration (such as song data having a time length of approximately 0.5 sec, for example) and performs FFT analysis, octave analysis, or other frequency analysis with respect thereto, thereby acquiring frequency information MS. The frequency information MS thus acquired is then supplied to the envelope analyzer 35 and the power analyzer 36.

The envelope analyzer 35 analyzes the envelope in the frequency range of the song data MT on the basis of the input frequency information MS. For example, the envelope analyzer 35 may compute envelope information MPe, wherein the envelope in a given frequency band has been digitized in a predetermined manner. In the present example, the value of the envelope slope is used as the envelope information MPe. The computed envelope information MPe is then supplied to the song categorizer 25.

The power analyzer 36 analyzes the power in the frequency range of the song data MT on the basis of the frequency information MS. For example, the power analyzer 36 may compute power information MPp, wherein the power in a given frequency band has been digitized in a predetermined manner. In the present example, the area of the portion enclosed by the envelope in a given frequency band (i.e., the value of the total power in a given frequency band) is used as the power information MPp. The computed power information MPp is then supplied to the song categorizer 25.

On the basis of the envelope information MPe supplied from the envelope analyzer 35 as well as the power information MPp supplied from the power analyzer 36, the song categorizer 25 categorizes the environmental noise by cross-referencing with a characteristic song quantity database 26. Subsequently, the song categorizer 25 generates song category information expressing the categorization result. The song category information thus generated is then supplied to a song category database 27.

The characteristic song quantity database 26 is a database when categorizing song data on the basis of characteristic quantities extracted from various song data. In the present example, envelope information MPe and power information MPp are used as the characteristic quantities of the songs. On the basis of the above characteristic quantities, the songs subject to comparison are categorized. For example, particular songs might be categorized as "Rock" or "Classical" on the basis of the characteristic song quantity database 26.

On the basis of the song category information supplied from the song categorizer 25, the song category database 27 records the song data from which characteristic quantities were computed, and in association with the categorization results based on those characteristic quantities. In this way, the song category database 27 stores categorization results for all song data recorded onto the playback apparatus 1.

The song category selector 28 cross-references the noise category information supplied from the noise categorizer 22 with the song category database 27, and then selects song category candidates determined to be suitable according to the categorization result for the current environmental noise. For example, a plurality of song categories may be selected, such as the first two or three song categories ranked in order of the closeness of the characteristic quantities with respect to those of the categorization result for the current environmental noise.

The characteristic noise quantity database 23 will now be described. The characteristic noise quantity database 23 is configured with boundary lines for each environment, the boundary lines being based on the characteristic quantities of environmental noise for a variety of environments picked up in advance. By means of such boundary lines, the current environmental noise can be categorized.

Figure 6A:
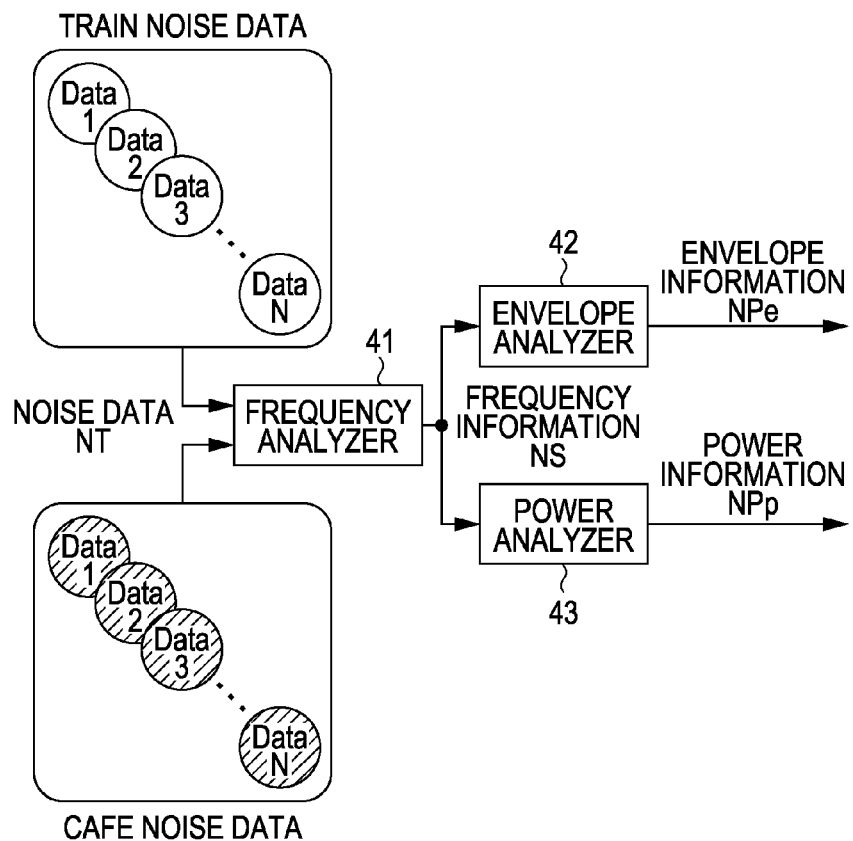
FIG. 6A is a diagram for explaining a method for the construction (including both the creating and updating) of a characteristic noise quantity database.

When creating the characteristic noise quantity database 23, noise data for environmental noise actually picked up in a variety of environments is first categorized by environment, as shown in FIG. 6A. In the present example, a plurality of picked-up noise data NT is categorized into environments such as "Train" and "Cafe". Subsequently, the plurality of noise data NT is supplied to a frequency analyzer 41.

The frequency analyzer 41 respectively analyzes the supplied plurality of noise data NT, thereby acquiring frequency information NS. The frequency information NS thus acquired is then supplied to both an envelope analyzer 42 and a power analyzer 43. On the basis of the frequency information NS, the envelope analyzer 42 computes envelope information NPe for each set of noise data NT. Meanwhile, on the basis of the frequency information NS, the power analyzer 43 computes power information NPp for each set of noise data NT.

Figure 6B:
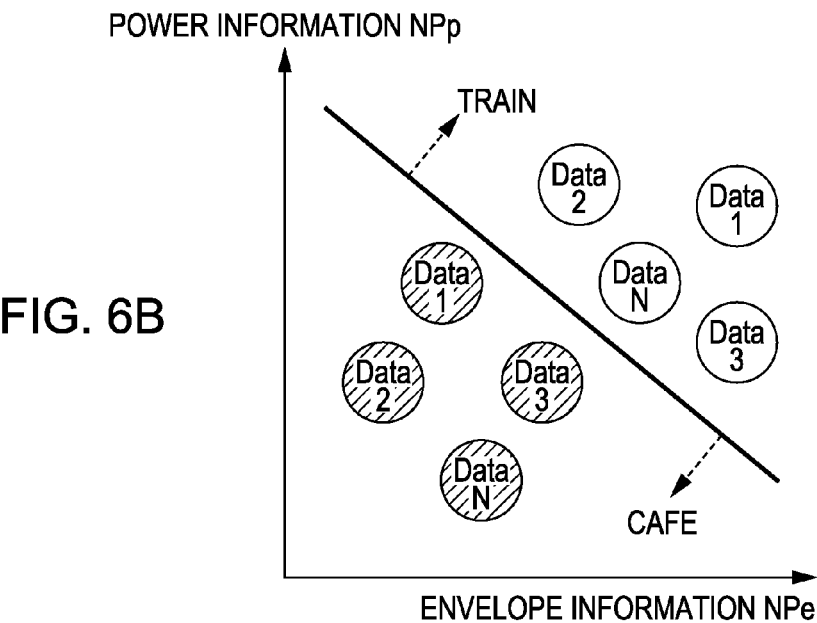
FIG. 6B is a diagram for explaining a method for the construction (including both the creating and updating) of a characteristic noise quantity database.

Next, on the basis of the envelope information NPe and the power information NPp thus computed, each set of noise data NT is mapped onto a two-dimensional plane defined by the envelope information NPe and the power information NPp, as shown in FIG. 6B. By mapping the noise data NT that has been categorized into environments such as "Train" and "Cafe", boundaries are formed on the two-dimensional plane between respective categories of the noise data NT, and thus boundary lines expressing the category boundaries are set.

Information regarding the boundary lines thus set is configured with two-dimensional plane data based on the characteristic quantities to form the characteristic noise quantity database 23. Consequently, by cross-referencing the characteristic quantities of noise data NT picked up at the time of song playback with the characteristic noise quantity database 23, the picked-up environmental noise can be categorized. For example, the envelope information NPe and the power information NPp of picked-up noise data NT may be cross-referenced with the characteristic noise quantity database 23. Subsequently, the environmental noise may be categorized into "Train" if the picked-up noise data NT lies above a particular boundary line, and categorized into "Cafe" if the picked-up noise data NT lies below the boundary line.

If the category boundaries are distinct, then boundary lines may also be set by human judgment. However, the setting of boundaries by human judgment becomes difficult when the category boundaries are indistinct, or when three or more dimensions of characteristic quantities are used. For this reason, it is preferable to set boundary lines by category using mathematical techniques, for example.

Furthermore, while the categorization of environmental noise into two environments ("Train" and "Cafe") is described by way of example herein, it should be appreciated that the present invention is not limited thereto. For example, boundary lines may be similarly set by environment when categorizing environmental noise into three or more environments, thereby enabling the categorization of environmental noise into three or more categories.

The characteristic song quantity database 26 will now be described. The characteristic song quantity database 26 is configured with boundary lines for each environment, the boundary lines being based on the characteristic quantities of songs categorized into a variety of categories. By means of such boundary lines, other songs can be categorized.

The characteristic song quantity database 26 can be created by using a method similar to that of the characteristic noise quantity database 23. First, the song data for songs with pre-identified categories are categorized by category. In the present example, a plurality of song data MT is categorized into categories such as "Rock" and "Classical". Subsequently, frequency information MS is obtained by analyzing the plurality of song data MT. On the basis of the frequency information MS, envelope information MPe and power information MPp are respectively computed for each set of song data MT.

Next, on the basis of the envelope information MPe and the power information MPp thus computed, each set of song data MT is mapped onto a two-dimensional plane defined by the power information MPp and the envelope information MPe. By mapping the song data MT that has been categorized into categories such as "Rock" and "Classical", boundaries are formed on the two-dimensional plane between respective categories of song data MT, and thus boundary lines expressing the category boundaries are set.

Information regarding the boundary lines thus set is configured with two-dimensional plane data based on the characteristic quantities to form the characteristic song quantity database 26. Consequently, by cross-referencing the characteristic quantities of song data MT recorded onto the playback apparatus 1 with the characteristic song quantity database 26, the songs recorded onto the playback apparatus 1 can be categorized. For example, the envelope information MPe and the power information MPp of a particular set of song data MT may be cross-referenced with the characteristic song quantity database 26. Subsequently, the song may be categorized into "Rock" if the song data MT lies above a particular boundary line, and categorized into "Classical" if the song data MT lies below the boundary line.

As described earlier, the present invention is not limited to the categorization of songs into the two categories of "Rock" and "Classical". For example, boundary lines may be similarly set by category when categorizing songs into three or more categories, thereby enabling the categorization of songs into three or more categories.

An exemplary display shown by the display unit 4 will now be described with reference to FIG. 2. In the first embodiment of the present invention, the environmental noise categorization result is displayed in a predetermined area within the display area of the display unit 4, while song category candidates that have been selected on the basis of environmental noise categorization result are displayed in an area separate from the above.

For example, a two-dimensional plane expressing the environmental noise categorization result may be displayed in an area on the left side of the display unit 4, while a two-dimensional plane expressing the song category candidates selected on the basis of the environmental noise categorization result may be displayed in an area on the right side of the display unit 4. The two-dimensional planes are defined by evaluation axes A and B that express the characteristic quantities extracted from both the environmental noise and the songs. Power information and envelope information may be used as the evaluation axes A and B, for example.

If instructions to present song category candidates according to the environmental noise are issued by the user, then the environmental noise is first categorized on the basis of characteristic quantities extracted from the current environmental noise picked up by the mike 3. Subsequently, the categorization result is mapped onto the two-dimensional plane on the left side, and a category name indicating the categorization result is displayed. In the example shown in FIG. 2, the environmental noise is categorized into "Category b" and displayed on the two-dimensional plane. Herein, the categories "Category a", "Category c", and "Category d" expressing other categorization results are not displayed. Furthermore, the categorization result display may also be configured to display a graphic symbol or similar figure enabling judgment of the category, without displaying a category name.

Songs are then categorized on the basis of characteristic quantities extracted from the songs recorded onto a recording medium within the playback apparatus 1. The categorization results are mapped onto the two-dimensional plane on the right side, on the basis of the characteristic quantities of the respective songs. For example, the respective songs recorded onto the recording medium may be categorized into categories from "Category 1" to "Category 7", and then mapped onto the two-dimensional plane.

At this point, since the categorization results for both the environmental noise and the songs are mapped on the basis of their respective characteristic quantities, the mapping indicates that the environmental noise and the songs have similar characteristics to the degree that the mapped positions of the environmental noise category and the song categories are close. As described earlier, if it is assumed that a song category having characteristics similar to those of the current environmental noise is easy to hear given such noise, then the song categories that are close to the mapped position of the current environmental noise can be assumed to be easy-to-hear song categories.

Consequently, song categories from among those mapped that are positioned close to the environmental noise categorization result are selected by the song category selector 28 as easy-to-hear song category candidates, and one or more category names expressing the categorization results are displayed on the two-dimensional plane on the right side. In the present example, song categories positioned close to the environmental noise categorization result "Category b" are selected, and thus the categories "Category 1", "Category 2", and "Category 3" enclosed by the broken circle centered about the position of the environmental noise categorization result shown in FIG. 2 are selected as song category candidates that are easy to hear given the current environmental noise. The selected song category candidates are thus displayed on the two-dimensional plane as recommended song categories. Herein, the categories from "Category 4" to "Category 7" that indicate non-selected song categories are not displayed.

Subsequently, the user selects a desired song category from among "Category 1" to "Category 3" displayed on the two-dimensional plane on the right side, thereby enabling the user to listen to songs categorized into the selected song category. The songs played at this point may be selected at random from among the song categorized into the selected song category, or the song having characteristic quantities closest to those of the environmental noise may be selected, for example. As another example, a list of the songs categorized into the selected song category may be displayed, whereby the user selects a song he or she wants to hear from among the displayed song list.

When displaying the song category candidates, it is preferable to display the portion enclosed by the broken circle such that, for example, a color gradient is formed at the center of the circle and lightening in the radially outward direction. Doing so confers a visual effect emphasizing that categories near the center of the circle are the most highly recommended, thereby increasing the effectiveness of the display.

Figure 7:
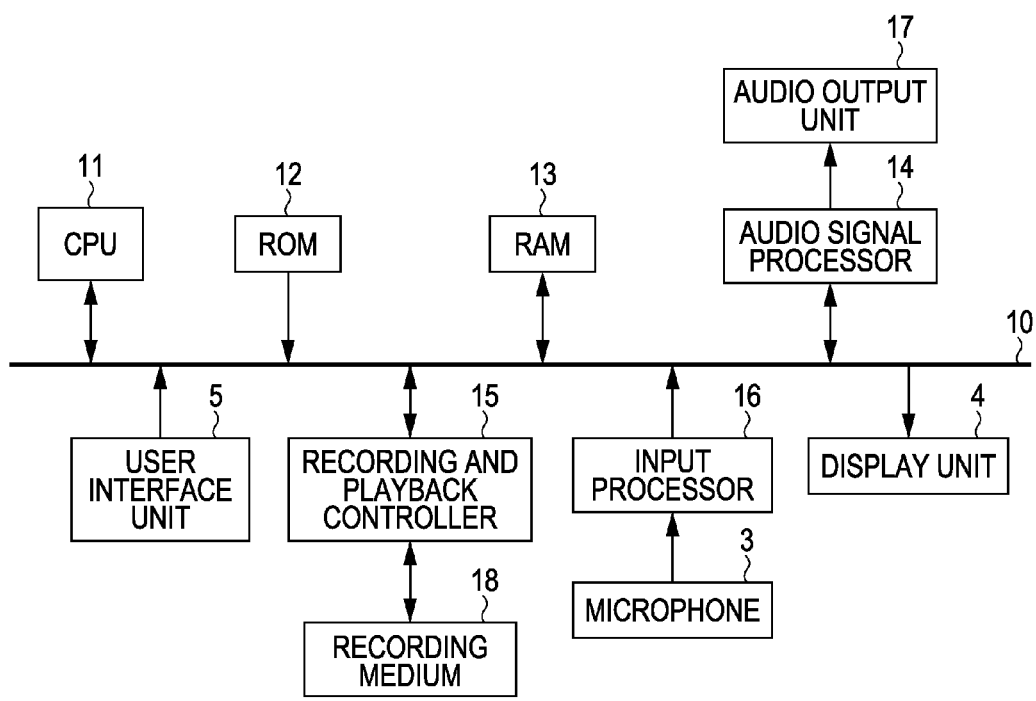
FIG. 7 is a block diagram illustrating an exemplary configuration of a playback apparatus to which the first embodiment of the present invention can be applied.

An exemplary configuration of a playback apparatus 1 to which the first embodiment of the present invention can be applied will now be described with reference to FIG. 7. It should be appreciated that in FIG. 7, portions unrelated to the first embodiment of the present invention are not shown, and description of such portions is omitted herein. In the playback apparatus 1, a CPU (central processing unit) 11, ROM (read-only memory) 12, RAM (random access memory) 13, an audio signal processor 14, a recording and playback controller 15, an input processor 16, a display unit 4, and a user interface unit 5 are connected via a bus 10.

The CPU 11 controls overall operation of the playback apparatus 1, using the RAM 13 as working memory and following programs stored in advance in the ROM 12. For example, the CPU 11 may control respective components by exchanging commands and data with such components via the bus 10. In addition, the CPU 11 also controls the playback of song data recorded onto a recording medium 18, in response to operations performed with respect to the user interface unit 5.

Figure 5:
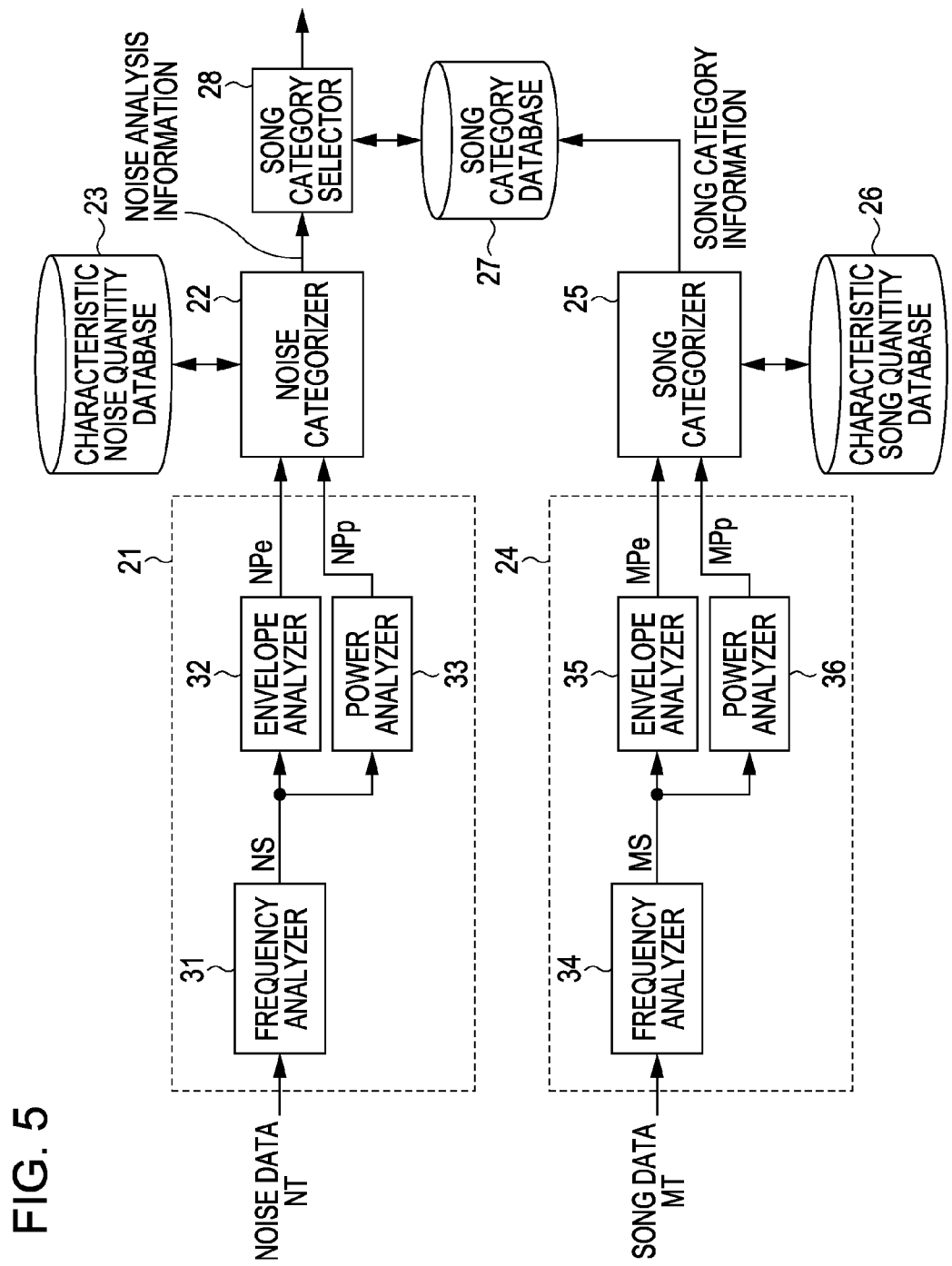
FIG. 5 is a block diagram for explaining a song category selection method based on environmental noise.

The CPU 11 selects a song category on the basis of the environmental noise, as shown in FIG. 5. More specifically, the CPU 11 receives, via the input processor 16, noise data for environmental noise picked up by the mike 3. The CPU 11 then analyzes the noise data and categorizes the environmental noise in a predetermined manner according to the analysis result. Meanwhile, the CPU 11 also receives, from the audio signal processor 14 later described, song data that has been converted into a digital audio signal. The CPU 11 then analyzes the song data, categorizes the songs, and then records the song data in the song category database 27 in association with the song categorization results. Subsequently, the CPU 11 cross-references the song category database 27 and selects a song category in a predetermined manner according to the environmental noise categorization result. The CPU 11 then controls playback of song data categorized into the selected song category. Herein, the song category database 27 is recorded onto the recording medium 18 later described, for example.

The audio signal processor 14 is connected to an audio output unit 17. The audio signal processor 14 receives song data for playback from the recording medium 18 later described and via the recording and playback controller 15. The audio signal processor 14 then performs D/A (digital/analog) conversion and other various processing with respect to the received song data, thereby converting the song data into an analog audio signal. If the song data has been compressed, then the audio signal processor 14 additionally performs decompression processing using a predetermined compression technique. Subsequently, the audio signal processor 14 supplies a digital audio signal to the CPU 11. Meanwhile, the audio signal processor 14 also outputs the analog audio signal via the audio output unit 17. The headphones 2 or one or more speakers may be used as the audio output unit 17, for example.

The recording and playback controller 15 is connected to the recording medium 18. The recording and playback controller 15 controls the recording of data to the recording medium 18, as well as the playback of data that has been recorded onto the recording medium 18. The recording medium 18 stores information such as the song data, as well as the characteristic noise quantity database 23 that is cross-referenced when analyzing noise data in the CPU 11. The recording medium 18 may be removable, non-volatile memory, or a removable or built-in hard disk, for example.

The input processor 16 is connected to the mike 3. The mike 3 picks up environmental noise, converts the noise data for the environmental noise into an analog audio signal, and then supplies the signal to the input processor 16. The input processor 16 then performs A/D (analog/digital) and other various processing with respect to the analog audio signal supplied from the mike 3, thereby converting the analog audio signal into digital noise data. The converted noise data is then supplied to the CPU 11.

The display unit 4 is able to display various information related to the song now playing, such as the song title, the artist name, and the playback time. In addition, the display unit 4 also displays the environmental noise categorization result, as well as selectable song category candidates chosen in accordance with the environmental noise categorization result.

The user interface unit 5 is provided with various user-operable elements used in order to operate the playback apparatus 1, and outputs control signals in response to operations made with respect to particular elements. For example, the user interface unit 5 may be provided with Play and Stop keys for starting and stopping the playback of song data, as well as a user-operable element for automatically selecting a song category candidate in accordance with the environmental noise. The user interface unit 5 may also be a touch panel overlaid with the display unit 4, for example.

Figure 8:
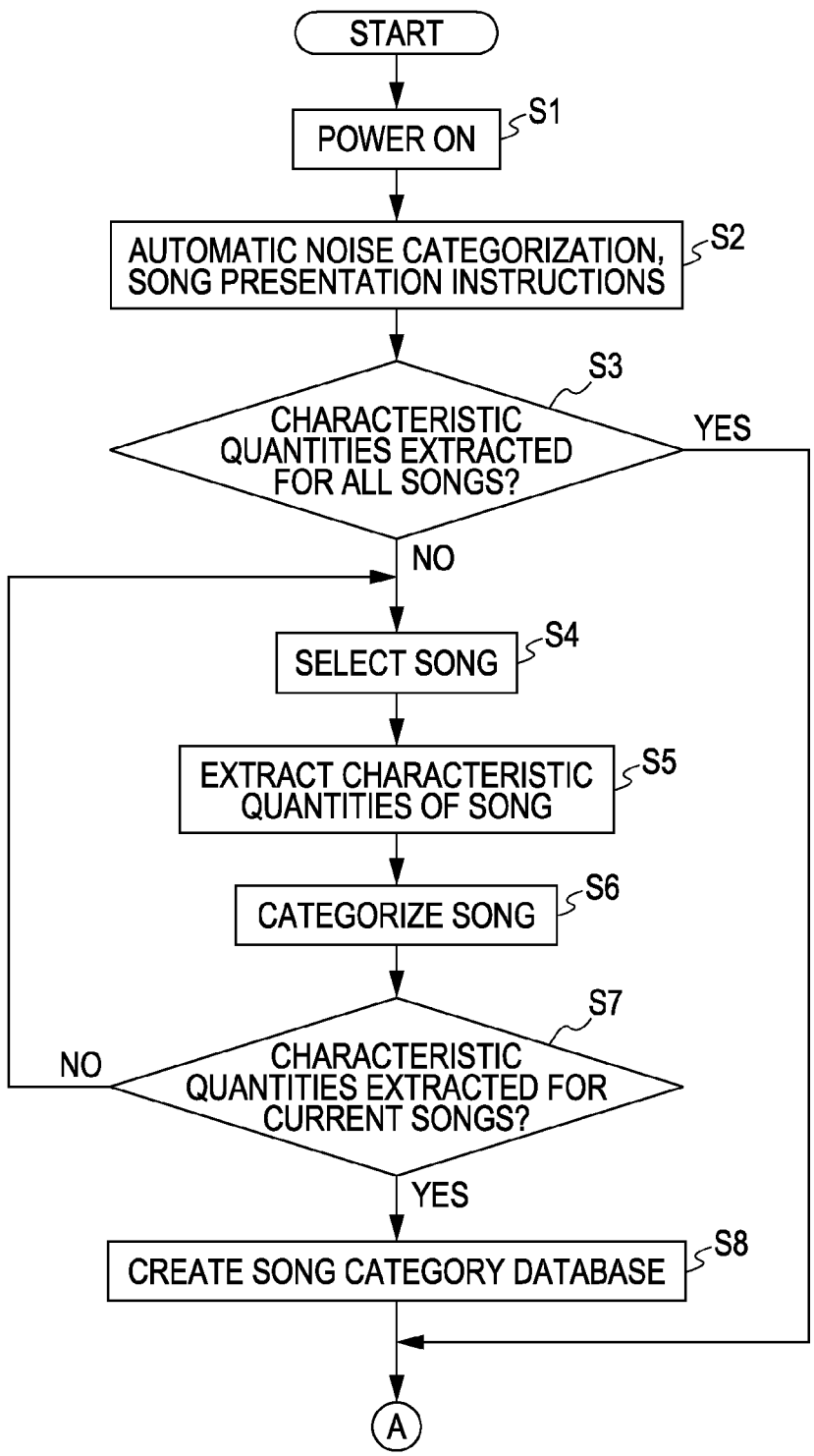
FIG. 8 is a flowchart for explaining a process flow for presenting song categories in the first embodiment of the present invention.
Figure 9:
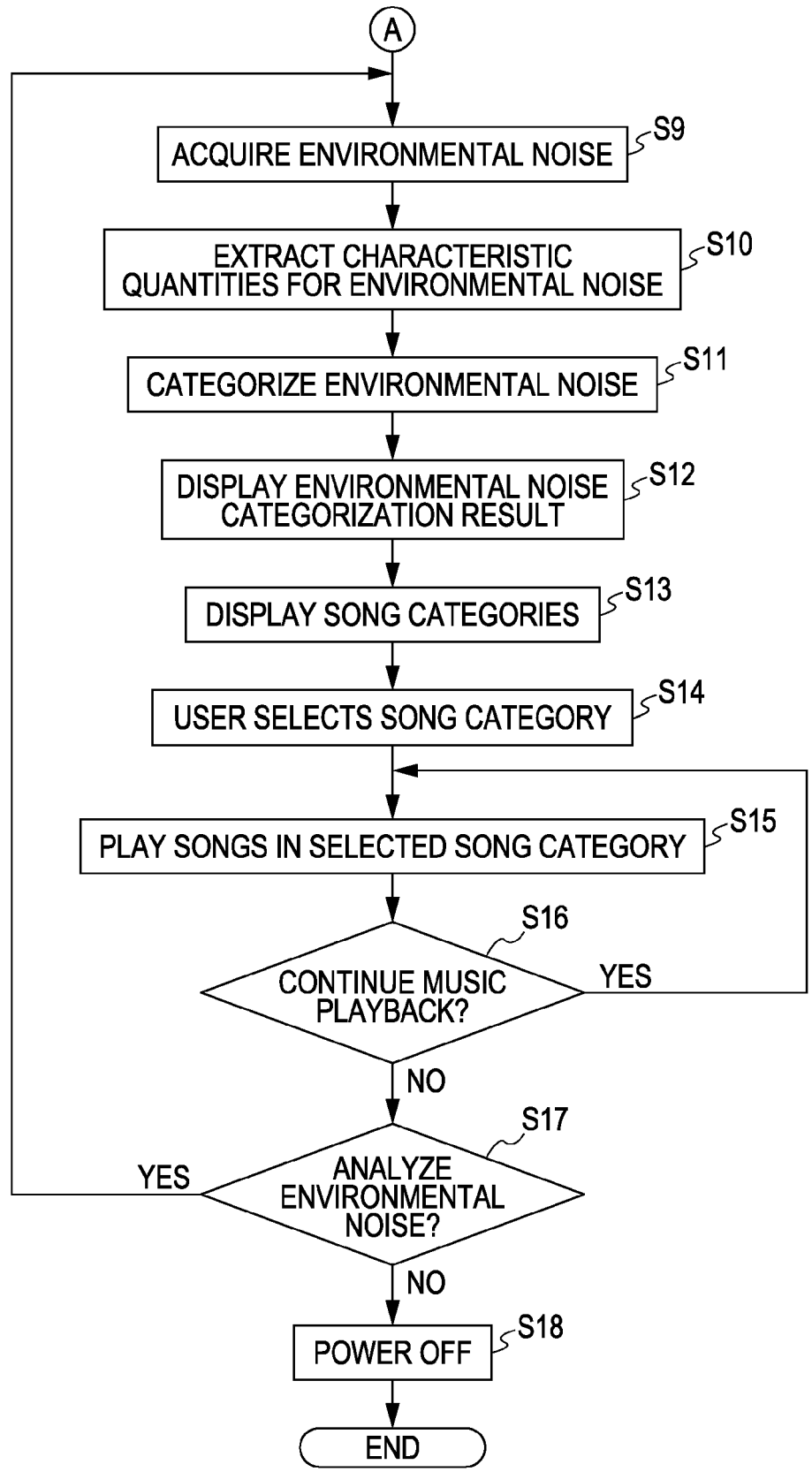
FIG. 9 is a flowchart for explaining a process flow for presenting song categories in the first embodiment of the present invention.

A process flow for presenting song categories in the first embodiment of the present invention will now be described with reference to the flowcharts illustrated in FIGS. 8 and 9. Unless otherwise stated, the processes hereinafter are taken to be controlled by the CPU 11.

In step S1, the playback apparatus 1 is powered on by the user. In step S2, a user-operable element for issuing instructions to present song categories in accordance with the environmental noise and provided on the user interface unit 5 is operated by the user.

In step S3, it is determined whether or not characteristic quantities have been computed and registered in the song category database 27 for all songs recorded onto the playback apparatus 1. If it is determined that characteristic quantities have not been computed for all songs, then the process transitions to step S4. In step S4, a song for characteristic quantity computation is selected. In step S5, frequency analysis is performed with respect to the song data MT of the selected song, and on the basis of the resulting frequency information MS, envelope information MPe and power information MPp (i.e., characteristic quantities of the song) are computed. In step S6, the envelope information MPe and the power information MPp thus computed are cross-referenced with the characteristic song quantity database 26, and the song is categorized.

In step S7, it is determined whether or not characteristic quantities have been computed for all songs targeted for characteristic quantity computation. If it is determined that characteristic quantities have been computed for all songs, then the process transitions to step S8, wherein the songs targeted for characteristic quantity computation are recorded in the song category database 27 in association with their respective characteristic quantities. If it is determined that characteristic quantities have not been computed for all songs, then the process returns to step S4, and another song for characteristic quantity computation is selected.

On the other hand, if it is determined in step S3 that characteristic quantities have been computed and registered in the song category database 27 for all songs, then the process transitions to step S9. In step S9, environmental noise is picked up via the mike 3, and noise data NT for the environmental noise is supplied to the CPU 11.

In step S10, frequency analysis is performed with respect to the noise data NT for the environmental noise, and on the basis of the resulting frequency information NS, envelope information NPe and power information NPp (i.e., characteristic quantities of the environmental noise) are computed. Subsequently, in step S11, the envelope information NPe and the power information NPp thus computed are cross-referenced with the characteristic noise quantity database 23, and the current environmental noise is categorized.

In step S12, the categorization result for the current environmental noise is displayed on the display unit 4, and in step S13 a plurality of song category candidates chosen in accordance with the categorization result for the current environmental noise is displayed on the display unit 4. In step S14, a particular song category is selected from among the song category candidates displayed on the display unit 4 as a result of an operation performed by the user with respect to the user interface unit 5.

In step S15, a particular song is selected from among the songs categorized into the selected song category, and the song data corresponding thereto is then read from the recording medium 18 and played back. The song played back at this point may, for example, be selected at random from among the songs categorized into the selected song category, or the song having characteristic quantities closest to those of the environmental noise may be selected. As another example, a list of the songs categorized into the selected song category may be displayed, whereby the user selects a song he or she wants to hear from the displayed song list.

In step S16, it is determined whether or not to continue music playback. If it is determined that music playback is to be continued, then the process returns to step S15, and playback of the current song is continued. When the current song finishes, another song categorized into the same song category is selected and played back. At this point, it is preferable to configure the apparatus to select another song, such that a song that has already been played back once is not selected a particular number of times, and such that the same song is not selected in succession.

On the other hand, if it is determined that music playback is to be terminated, then the process transitions to step S17, and it is subsequently determined whether or not to re-analyze the current environmental noise. If it is determined that the environmental noise is to be analyzed, then the process returns to step S9, and the current environmental noise is picked up by the mike 3. If it is determined that the environmental noise is not to be analyzed, then the playback apparatus 1 is powered off by the user in step S18, and the above series of processes is terminated.

Herein, the categorization of songs and the establishing (or in some cases, the updating) of the song category database in steps S4 to S8 may be conducted at the point when instructions are issued to present song categories in accordance with the environmental noise categorization result, or at the point when song data is recorded onto the recording medium 18. However, the present invention is not limited to the foregoing, and song data may also be recorded onto the recording medium 18 after having been categorized in advance, externally to the playback apparatus 1. In this case, the processes in step S5 and S6 may be omitted, and a song category database may be established in step S8 in accordance with the already-performed song categorization results.

In this way, in the first embodiment of the present invention, a plurality of song categories suited to the current environmental noise are selected on the basis of an environmental noise categorization result and then presented to the user. The ultimate selection of a song category is then conducted by the user, and thus a song category matching the user's preferences can be selected.

A modification of the first embodiment of the present invention will now be described. In the first embodiment described above, the environmental noise categorization result and the selectable song category candidates chosen on the basis of the environmental noise categorization result are respectively displayed on independent planes. However, in cases where the display area of the display unit provided in the playback apparatus is small, for example, the display might become hard to read if the categorization results for the environmental noise and the songs are displayed independently. Consequently, the present modification of the first embodiment of the present invention is configured such that the environmental noise categorization result and the song category candidates are displayed on the same plane.

Figure 10:
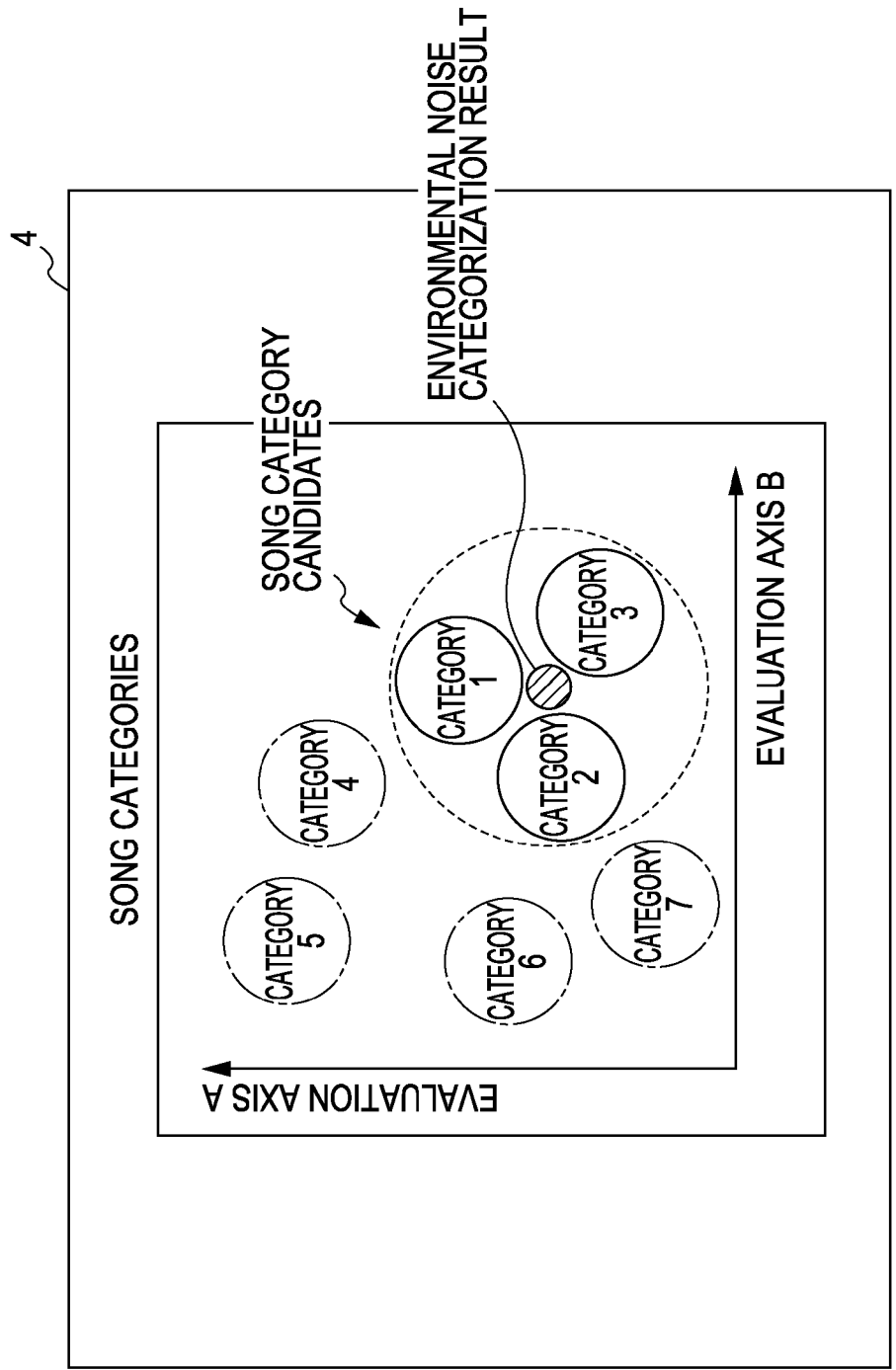
FIG. 10 is a diagram illustrating an exemplary display shown by a display unit in accordance with a modification of the first embodiment of the present invention.

FIG. 10 illustrates an exemplary display shown by a display unit in accordance with the present modification of the first embodiment of the present invention. In the present modification of the first embodiment of the present invention, a two-dimensional plane is defined by evaluation axes A and B, wherein power information and envelope information are used as characteristic quantities. On this single two-dimensional plane are displayed both the environmental noise categorization result, as well as song category candidates selected on the basis of the environmental noise categorization result.

When instructions for presenting song category candidates in accordance with the environmental noise are issued by the user, the environmental noise is first categorized on the basis of characteristic quantities extracted from the current environmental noise. Subsequently, the environmental noise categorization result is mapped onto the two-dimensional plane, and a category name indicating the categorization result is displayed. The categorization result for the current environmental noise is displayed so as to be indicated by the shaded portion in FIG. 10, for example.

In addition, song recorded onto the recording medium 18 in the playback apparatus 1 are categorized into categories from "Category 1" to "Category 7", for example, on the basis of characteristic quantities extracted from the songs. The songs are then mapped onto the two-dimensional plane. Assuming that a song category having characteristics similar to those of the current environmental noise is easy to hear given such noise, the song categories among those mapped that are close to the mapped position of the current environmental noise are then selected by the song category selector 28 as easy-to-hear song category candidates. Category names indicating the categorization results are then displayed on the two-dimensional plane.

In the present example, "Category 1", "Category 2", and "Category 3" enclosed by the broken circle centered about the position of the environmental noise categorization result shown in FIG. 10 are selected as song category candidates that are easy to hear given the current environmental noise, and then displayed on the two-dimensional plane. The categories from "Category 4" to "Category 7" that indicate non-selected song categories are not displayed. Subsequently, the user selects a desired song category from among the categories "Category 1" to "Category 3" displayed on the two-dimensional plane, thereby enabling the user to listen to songs categorized into the selected song category.

Since the environmental noise categorization result as well as the selectable song category results are displayed on the same plane, if the category names for both results are displayed at this point, then the display might become confusing. For this reason, in order to distinguish between the environmental noise categorization result and the song category results, it is preferable to display only the song category names, while displaying the environmental noise categorization result as a point, circle, or similar figure. It is furthermore preferable to cause the symbol indicating the environmental noise categorization result to blink, for example.

When displaying the song category candidates, it is also preferable to visually display the portion enclosed by the broken circle using a gradient, for example, similar to that of the first embodiment described earlier.

In this way, in the present modification of the first embodiment of the present invention, both the environmental noise categorization result and the selectable song category candidates are displayed on the same plane, thereby enabling the user to intuitively determine which song categories are suited to the current environmental noise.

A second embodiment of the present invention will now be described. In the second embodiment of the present invention, song category candidates are first selected in accordance with the current environmental noise, in a manner similar to that of the first embodiment described earlier. Subsequently, the song category playback frequency is used to extract song categories having a high playback frequency from the song category candidates. A limited display of just the extracted song categories is then presented.

A method for limiting the presentation of song categories suited to the current environmental noise will now be described with reference to FIG. 11. Hereinafter, identical reference numbers are used for portions shared with those of the first embodiment described earlier and with reference to FIG. 5, and detailed description of such portions is omitted. Furthermore, since the envelope information NPe and the power information NPp that is generated from the noise data NT picked up by the mike 3 and supplied to the noise categorizer 22 is similar to that of the first embodiment described earlier, further description thereof is omitted herein.

On the basis of the envelope information NPe supplied from the envelope analyzer 32 as well as the power information NPp supplied from the power analyzer 33, the noise categorizer 22 categorizes the environmental noise by cross-referencing with the characteristic noise quantity database 23. Subsequently, the noise categorizer 22 generates noise category information expressing the categorization result. The noise category information thus generated is then supplied to the song category selector 28.

The song category selector 28 cross-references the noise category information supplied from the noise categorizer 22 with the song category database 27, and then selects song category candidates determined to be suitable according to the categorization result for the current environmental noise. For example, a plurality of song categories may be selected, such as the first three song categories ranked in order of the closeness of the characteristic quantities with respect to those of the categorization result for the current environmental noise. The song category selector 28 then generates song category selection information expressing the selected song categories, and supplies the song category selection information to the limiter 51.

The limiter 51 cross-references the song category selection information supplied from the song category selector 28 with a playback frequency database 52, so as to limit the number of selected song categories to a particular plurality of song categories. For example, the selected song categories may be limited to the first two song categories ranked in order of high playback frequency from among the selected song category candidates expressed by the song category selection information.

The playback frequency database 52 stores song categories in association with respective playback frequencies based on playback histories of song categories played in the past. The playback frequency database 52 receives playback information expressing the playback history at the time a particular song is played back, and then records the category of the played song in association with the playback history. As shown in FIG. 12, playback frequencies based on the playback history of each song category are recorded in the playback frequency database 52 in a stepwise manner. In the present example, the playback frequency of each song category is expressed in five steps, with greater numbers of star symbols indicating higher playback frequencies for given song categories. In the example shown in FIG. 12, the playback frequency of the song category "Category 1" is the highest, while the playback frequency of the song category "Category 3" is the lowest.

Figures 11, 12:
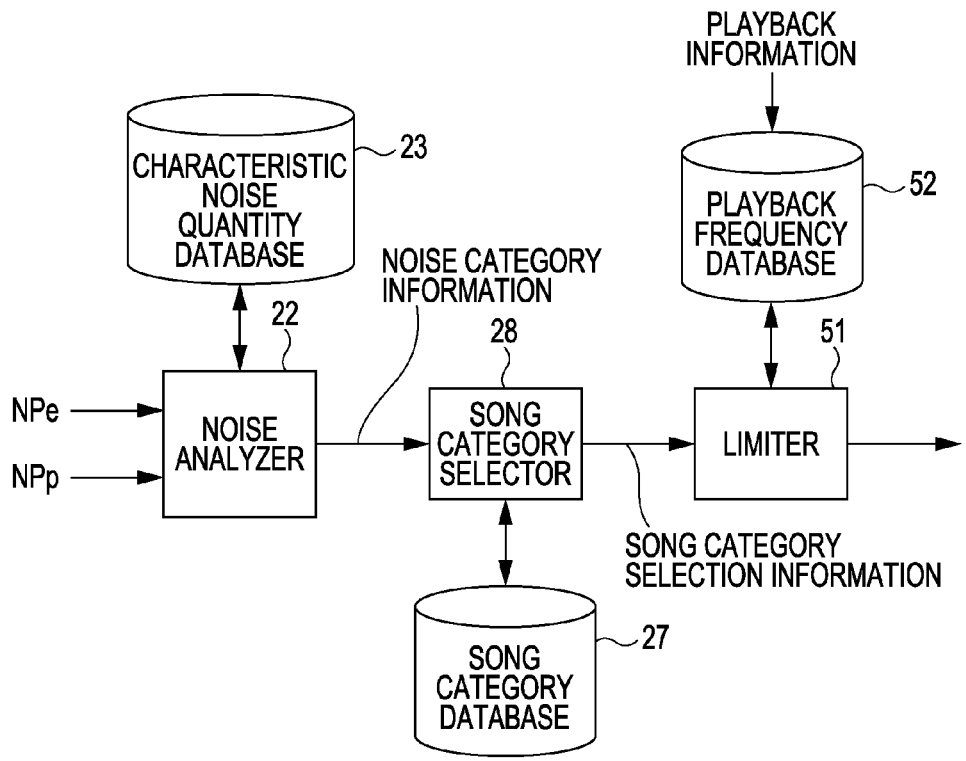
FIG. 11 is a block diagram for explaining a limited song category selection method in a second embodiment of the present invention.
FIG. 12 is a diagram for explaining a playback frequency database.

Consider the case wherein a playback frequency database 52 like that shown by way of example in FIG. 12 is established, and wherein the song categories "Category 1", "Category 2", and "Category 3" are selected by the song category selector 28. Upon receiving song category selection information from the song category selector 28 indicating that the song categories "Category 1", "Category 2", and "Category 3" have been selected, the limiter 51 cross-references the playback frequency database 52 shown in FIG. 12.

From the database cross-reference result, the limiter 51 determines that the song category "Category 3" has the lowest playback frequency among the song categories from "Category 1" to "Category 3", and then selects the song categories "Category 1" and "Category 2" while deselecting "Category 3". Subsequently, the song categories "Category 1" and "Category 2" selected by the limiter 51 are displayed on the display unit 4.

Figure 13:
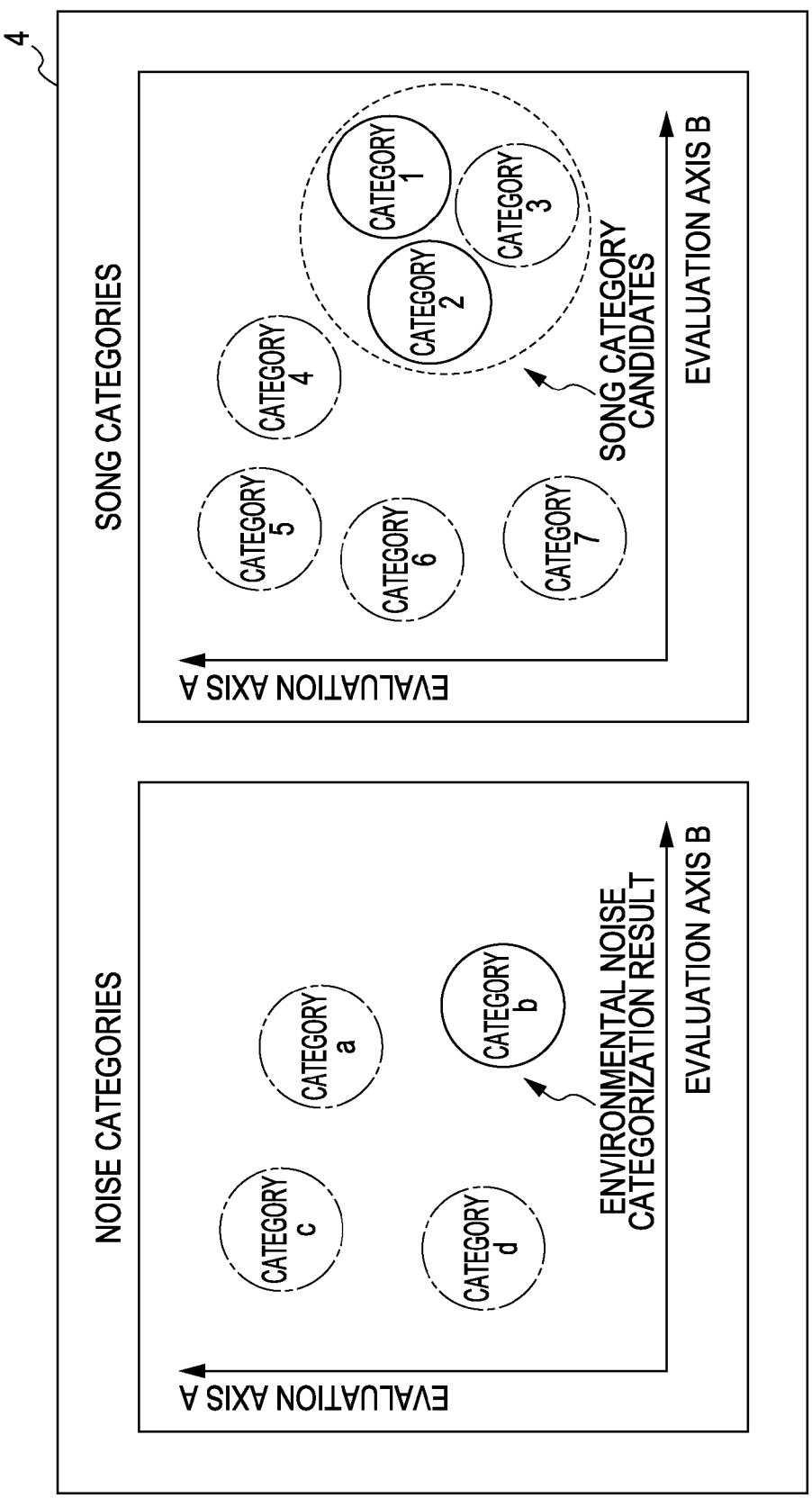
FIG. 13 is a diagram illustrating an exemplary display shown by a display unit in the second embodiment of the present invention.

An exemplary display shown by the display unit 4 in the second embodiment of the present invention will now be described. FIG. 13 illustrates an example wherein the environmental noise categorization result and the selectable song category candidates chosen on the basis of the environmental noise categorization result are respectively displayed on independent planes.

An environmental noise categorization result is mapped on the two-dimensional plane shown on the left side of FIG. 13, and a category name indicating the categorization result is displayed. The environmental noise categorization result is based on characteristic quantities extracted from the current environmental noise. In the present example, the environmental noise is categorized into "Category b" and displayed on the two-dimensional plane.

Meanwhile, song category results are mapped on the two-dimensional plane shown on the right side of FIG. 13, the song category results being based on characteristic quantities extracted from songs recorded onto the recording medium 18 in the playback apparatus 1. For example, individual songs recorded onto the recording medium may be categorized into categories from "Category 1" to "Category 7" and then mapped. Song categories from among those mapped that are positioned close to the environmental noise categorization result are selected by the song category selector 28 as easy-to-hear song category candidates.

Herein, the second embodiment of the present invention is configured to additionally choose, on the basis of playback frequency, selectable song category candidates from among the plurality of selected song categories. For this reason, in the limiter 51, playback frequencies are determined on the basis of the playback frequency database 52, song categories determined to have low playback frequencies are deselected, leaving only song categories having high playback frequencies from among the selected song category candidates. For example, the selected song categories may be limited to a predetermined number of categories, such as two or three. The category names of the song category candidates thus selected are then displayed on the two-dimensional plane on the right side.

In the present example, song categories positioned close to the environmental noise categorization result "Category b" are selected, and thus the categories "Category 1", "Category 2", and "Category 3" enclosed by the broken circle centered about the position of the environmental noise categorization result shown in FIG. 13 are selected as easy-to-hear (i.e., recommended) song category candidates. In the limiter 51, playback frequencies are subsequently determined on the basis of the playback frequency database 52, wherein "Category 3" is determined to have a low playback frequency and is thus excluded from the song category candidates. Consequently, only "Category 1" and "Category 2" are displayed as recommended song category candidates on the two-dimensional plane on the right side. Since the song category "Category 3" has a low playback frequency and is excluded from the candidates, "Category 3" is not displayed, even though "Category 3" is contained within the area indicated by the broken circle.

Although the song category "Category 3" has a low playback frequency and is excluded from the candidates, "Category 3" may also be displayed within the area indicated by the broken circle. However, in this case, since the song category "Category 3" differs from "Category 1" and "Category 2", it is preferable to display "Category 3" in a manner distinguishable from that of the other song categories, such as by displaying "Category 3" with lighter intensity on the display unit 4.

Figure 14:
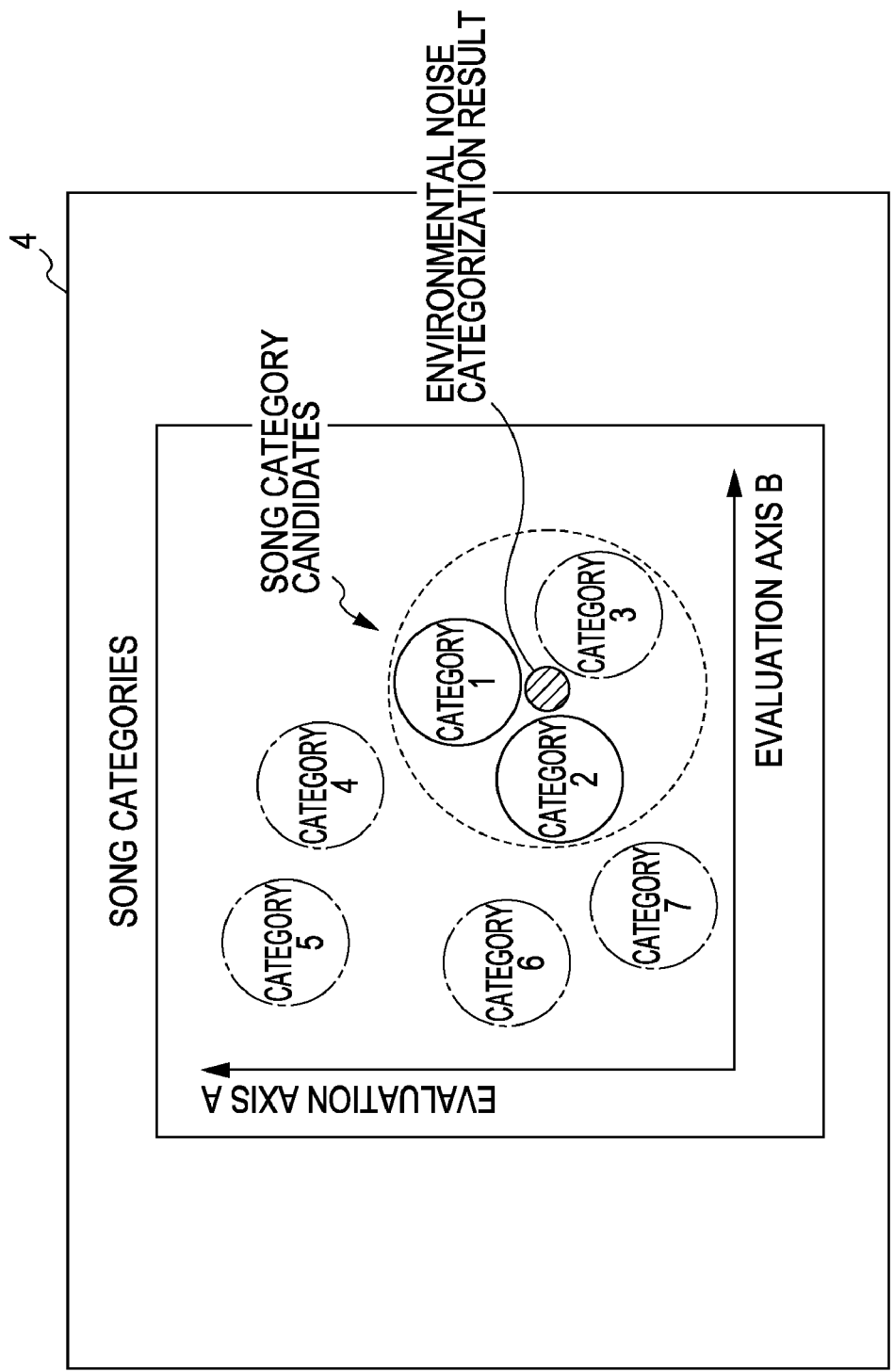
FIG. 14 is a diagram illustrating another exemplary display shown by a display unit in the second embodiment of the present invention.

When displaying both the environmental noise categorization result as well as the selectable song category candidates chosen on the basis on the environmental noise categorization result on the same plane, the categorization for the current environmental noise may be displayed as a shaded portion or other figure, as shown in FIG. 14.

In addition, the song categories categorized into "Category 1" to "Category 7" may be mapped, with the song categories positioned close to the environmental noise categorization result being selected by the song category selector 28 as easy-to-hear song category candidates. In the limiter 51, playback frequencies are subsequently determined on the basis of the playback frequency database 52, wherein the selection is limited to just a predetermined number of song categories having a high playback frequencies from among the selected song category candidates. The limited selection of song category candidates is then displayed on the two-dimensional plane.

In the present example, the categories "Category 1", "Category 2", and "Category 3" enclosed by the broken circle centered about the environmental noise categorization result shown in FIG. 14 are selected as song category candidates that are easy-to-hear given the current environmental noise. In the limiter 51, playback frequencies are subsequently determined on the basis of the playback frequency database 52, wherein "Category 3" is determined to have a low playback frequency and is thus excluded from the song category candidates, and "Category 1" and "Category 2" are displayed as recommended song category candidates. Similar to the example shown in FIG. 13, the song category "Category 3" is not displayed.

Although the song category "Category 3" has a low playback frequency and is excluded from the candidates, "Category 3" may also be displayed within the area indicated by the broken circle. However, in this case, since the song category "Category 3" differs from "Category 1" and "Category 2", it is preferable to display "Category 3" in a manner distinguishable from that of the other song categories, such as by displaying "Category 3" with lighter intensity on the display unit 4.

Figure 15:
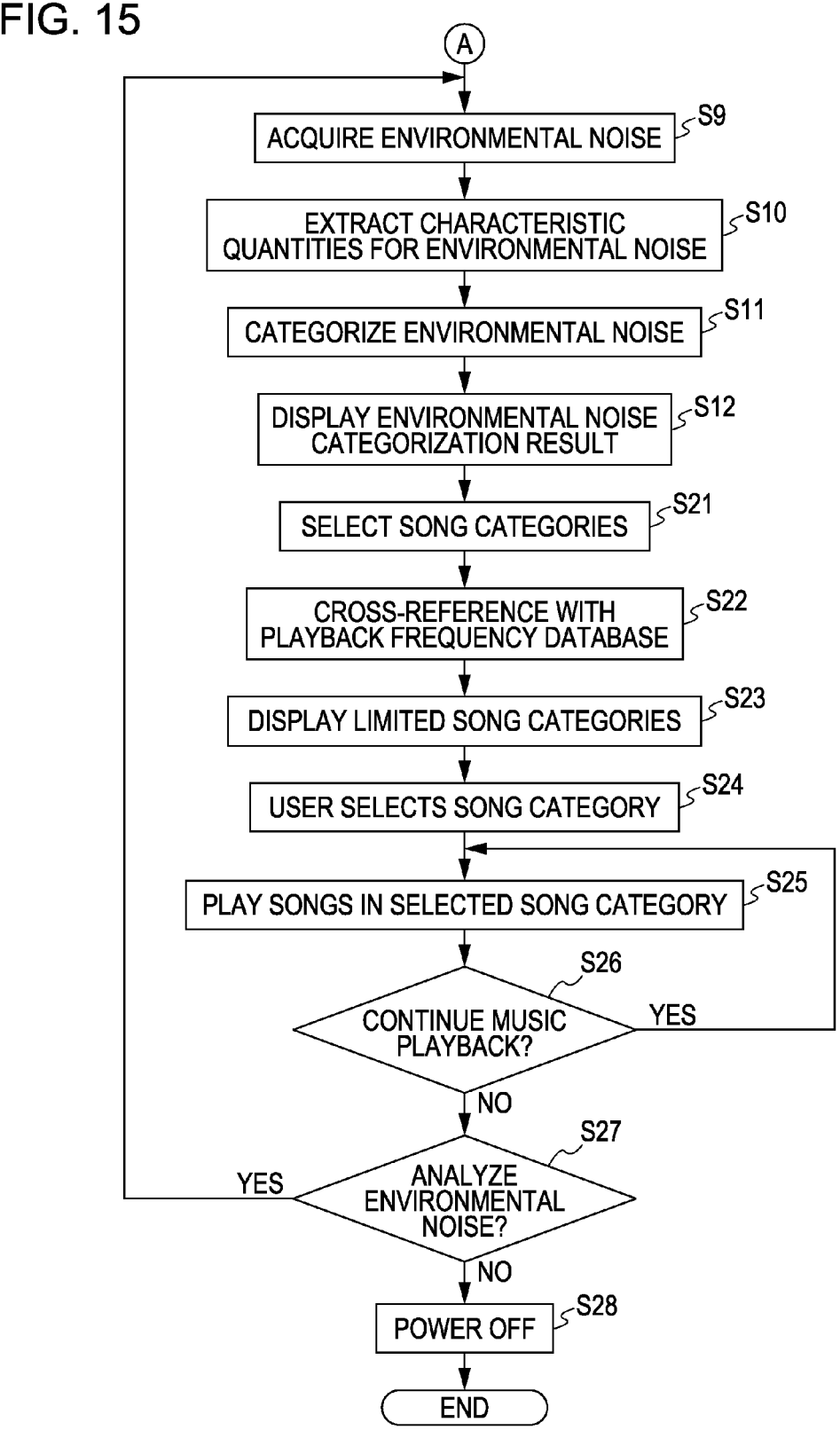
FIG. 15 is a flowchart for explaining a process flow for presenting song categories in the second embodiment of the present invention.

A process flow for presenting song category candidates in the second embodiment of the present invention will now be described with reference to the flowchart shown in FIG. 15. Unless otherwise stated, the processes hereinafter are taken to be controlled by the CPU 11. Furthermore, identical reference numbers are used for portions shared with those of the first embodiment described earlier and with reference to FIGS. 8 and 9, and detailed description of such portions is omitted. The processes in steps S1 to S12 are similar to those shown in FIG. 8, and further description thereof is also omitted.

In step S21, a plurality of song category candidates are selected in accordance with the categorization result for the current environmental noise obtained in step S11. In step S22, the limiter 51 cross-references the song category selection information expressing the selected plurality of song category candidates with the playback frequency database 52, and limits the selection of song category candidates to a predetermined number of song categories ranked in order of playback frequency. Subsequently, in step S23, the limited selection of song category candidates is displayed on the display unit 4.

In step S24, a particular song category is selected from among the song category candidates displayed on the display unit 4 as a result of an operation performed by the user with respect to the user interface unit 5. In step S25, a particular song is played from among the songs categorized into the selected song category.

In step S26, it is determined whether or not to continue music playback. If it is determined that music playback is to be continued, then the process returns to step S25, and playback of the current song is continued. When the current song finishes, another song categorized into the same song category is selected and played back.

On the other hand, if it is determined that music playback is to be terminated, then the process transitions to step S27, and it is subsequently determined whether or not to re-analyze the current environmental noise. If it is determined that the environmental noise is to be analyzed, then the process returns to step S9. If it is determined that the environmental noise is not to be analyzed, then in step S28, the playback apparatus 1 is powered off by the user, and the above series of processes is terminated.

In this way, in the second embodiment of the present invention, song categories having low playback frequencies that the user does not usually listen to are de-prioritized, and the display of song category candidates suited to the current environmental noise is limited to those song categories that are listened to with high frequency. In so doing, the user is better able to select a song category matching his or her preferences.

A third embodiment of the present invention will now be described. In the third embodiment of the present invention, processing for presenting song category candidates in accordance with the environmental noise felt by the user is applied to a playback apparatus having noise canceling functions.

Noise canceling functions involve using picked-up environmental noise as a basis for generating an anti-phase signal that cancels out the environmental noise, and then applying the signal components to the playback audio to thereby reduce the environmental noise felt by the user.

For example, if the mike 3 is built into the headphones 2, then the environmental noise felt by the user at the time of song playback is environmental noise whose noise has been reduced by the noise canceling functions. Likewise, the environmental noise picked up by the mike 3 is environmental noise whose noise has been reduced by the noise canceling functions.

In this case, since the environmental noise felt by the user and the environmental noise picked up by the mike 3 are identical, the environmental noise picked up by the mike 3 can be directly analyzed and categorized, and song category candidates suited to the current environmental noise can be presented in accordance with the environmental noise categorization result. In other words, if the mike 3 is built into the headphones 2, then song category candidates suited to the environmental noise felt by the user can be presented by conducting processing similar to that of the first embodiment described earlier.

In contrast, if the mike 3 is provided externally to the headphones 2, then the environmental noise felt by the user is environmental noise whose noise has been reduced by noise canceling functions. However, the environmental noise picked up by the mike 3 is not environmental noise whose noise has been reduced by noise canceling functions, but rather the actual environmental noise itself.

In this case, the environmental noise felt by the user and the environmental noise picked up by the mike 3 are not identical. For this reason, song category candidates actually suited to the environmental noise felt by the user might not be presented, even after analyzing and categorizing the environmental noise picked up by the mike 3 and presenting song category candidates in accordance with the environmental noise categorization result.

Consequently, in the third embodiment of the present invention, if the mike 3 is provided externally to the headphones 2, then processing is performed with respect to the environmental noise picked up by the mike 3 that is equivalent to that of the case when the noise canceling functions are turned on, thereby generating noise-reduced environmental noise. Subsequently, the noise-reduced environmental noise is analyzed and categorized, and song category candidates suited to the current environmental noise are presented in accordance with the categorization result.

Figure 16:
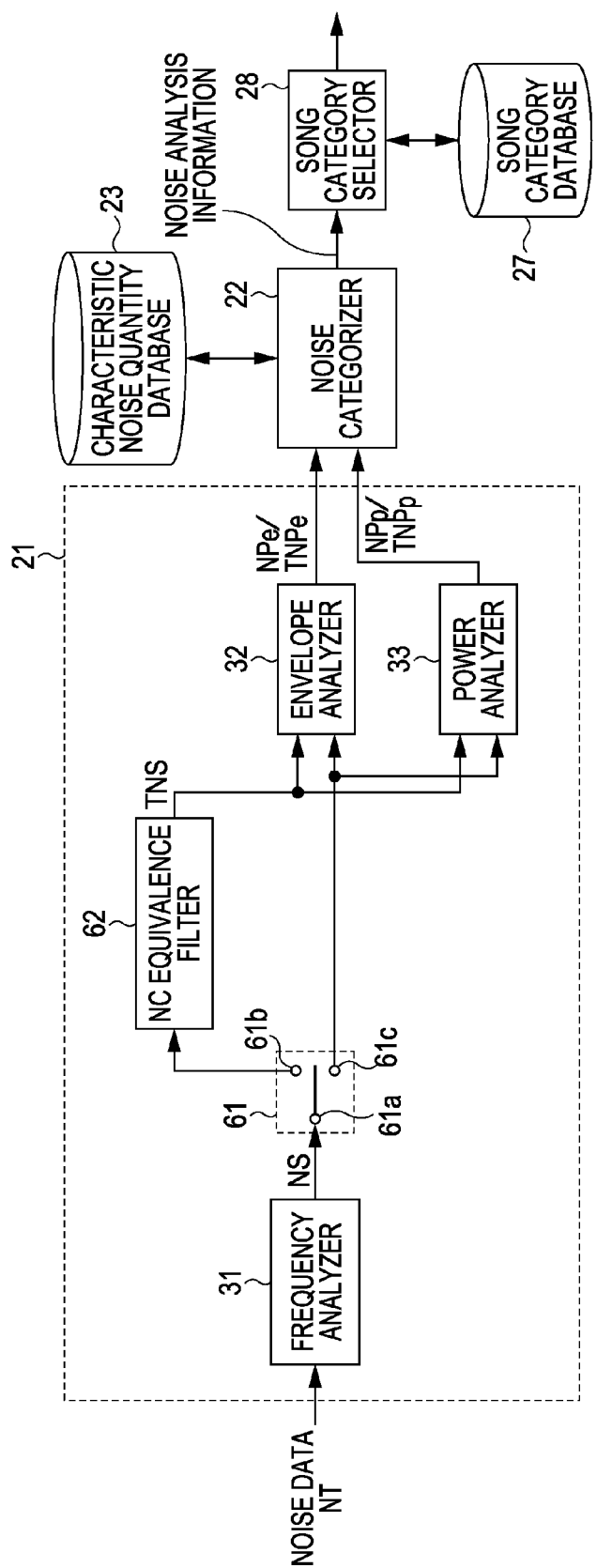
FIG. 16 is a block diagram for explaining a song category selection method based on environmental noise in a third embodiment of the present invention.

FIG. 16 is a block diagram for explaining a method for selecting song categories suited to the current environmental noise, in the case where the mike 3 is provided externally to the headphones 2. In the present example, analysis of environmental noise involves analysis of the envelope and power in the frequency range of the environmental noise, wherein the analysis results are computed as the characteristic quantities of the environmental noise. Hereinafter, identical reference numbers are used for portions shared with that described earlier and illustrated in FIG. 5, and detailed description of such portions is omitted.

Noise data NT for environmental noise picked up by the mike 3 is first supplied to the frequency analyzer 31 of the characteristic quantity extractor 21. The frequency analyzer 31 performs predetermined frequency analysis with respect to the input noise data NT, thereby acquiring frequency information NS. The acquired frequency information NS is then supplied to a switch 61.

The switch 61 is provided with an input terminal 61*a* and output terminals 61*b* and 61*c*. In response to the turning on or off of noise canceling functions by a user operation performed with respect to the user interface unit 5, the switch 61 selectively outputs frequency information NS input into the input terminal 61*a* from one of the output terminals 61*b* and 61*c*.

When the noise canceling functions are turned on, the output terminal 61*b* is selected, and the frequency information NS input into the input terminal 61*a* is output from the output terminal 61*b* and supplied to an equivalence filter 62. In contrast, when the noise canceling functions are turned off, the output terminal 61*c* is selected, and the frequency information NS is output from the output terminal 61*c* and supplied to the envelope analyzer 32 and the power analyzer 33.

The equivalence filter 62 takes the frequency information NS for the noise data NT of the picked-up environmental noise, and performs processing so as to obtain effects equivalent to the reduction effects obtained when using noise canceling functions. In so doing, the equivalence filter 62 generates noise data frequency information TNS equivalent to the noise-reduced case. The frequency information TNS thus generated is then supplied to the envelope analyzer 32 and the power analyzer 33.

The envelope analyzer 32 conducts envelope analysis on the basis of the frequency information NS supplied from the frequency analyzer 31 via the switch 61, or alternatively, on the basis of the frequency information TNS supplied from the equivalence filter 62, and subsequently computes envelope information NPe or TNPe, respectively. The envelope information NPe or TNPe thus computed is then supplied to the noise categorizer 22.

The power analyzer 33 conducts power analysis on the basis of the frequency information NS supplied from the frequency analyzer 31 via the switch 61, or alternatively, on the basis of the frequency information TNS supplied from the equivalence filter 62, and subsequently computes power information NPp or TNPp, respectively. The power information NPp or TNPp thus computed is then supplied to the noise categorizer 22.

The noise categorizer 22 categorizes the environmental noise by cross-referencing the envelope information NPe/TNPe and power information NPp/TNPp with the characteristic noise quantity database 23, thereby noise category information. The noise category information thus generated is then supplied to the song category selector 28.

The song category selector 28 cross-references the noise category information supplied from the noise categorizer 22 with the song category database 27, and then selects song category candidates suited to the environmental noise felt by the user. For example, a plurality of song categories may be selected, such as the first two or three song categories ranked in order of the closeness of the characteristic quantities with respect to those of the categorization result for the environmental noise felt by the user.

It should be appreciated that the reduction effects imparted to the noise data NT by the equivalence filter 62 are not limited to being exactly identical to the reduction effects resulting from the noise canceling functions. Rather than accurately reproducing the reduced environmental noise, the equivalence filter 62 herein may simply enable the determination of how the characteristic quantities of the environmental noise broadly changed as a result of the noise canceling functions.

Figure 17:
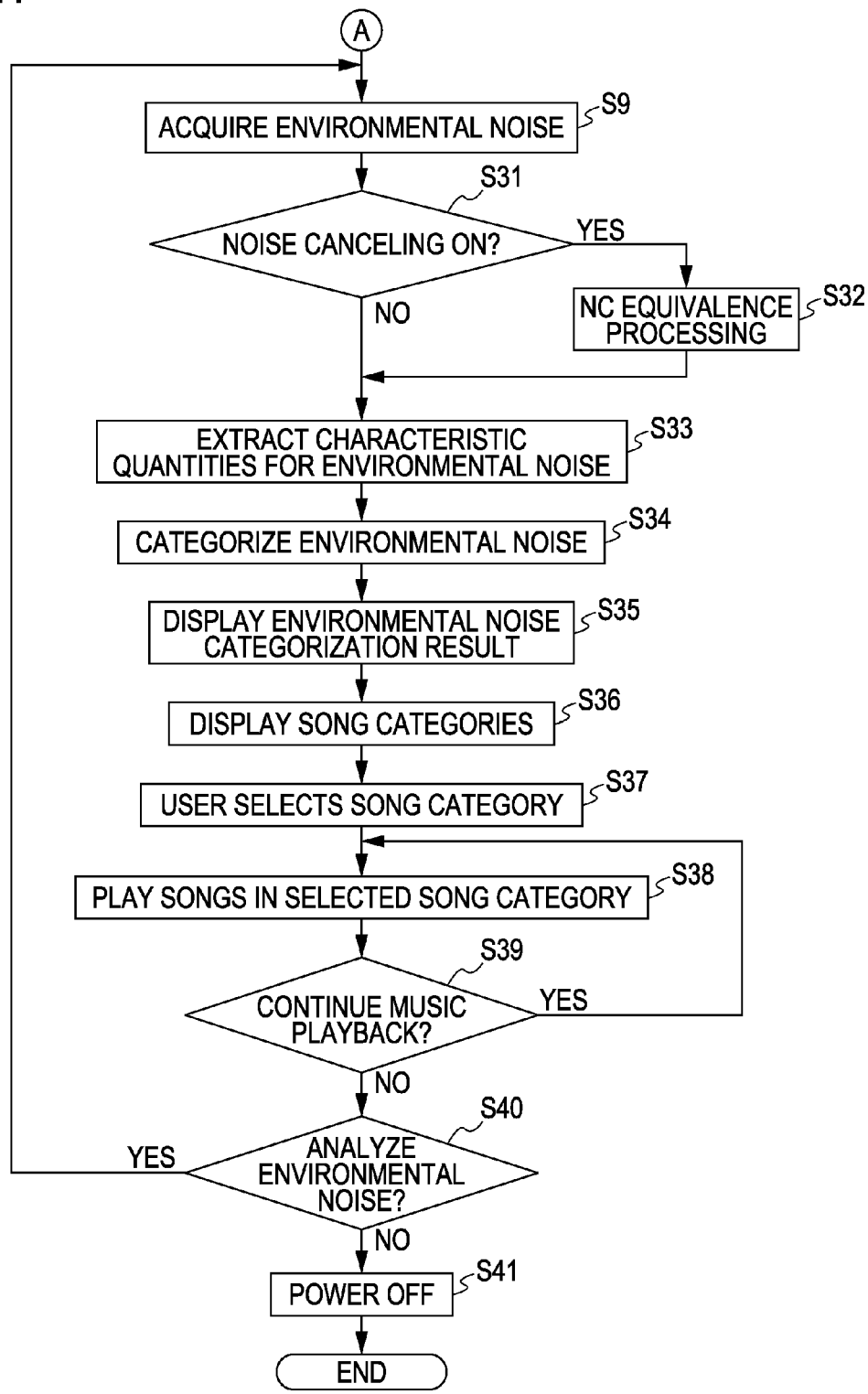
FIG. 17 is a flowchart for explaining a process flow for presenting song categories in the third embodiment of the present invention.

A process flow for presenting song categories in the third embodiment of the present invention will now be described with reference to the flowchart shown in FIG. 17. Unless otherwise stated, the processes hereinafter are taken to be controlled by the CPU 11. Furthermore, identical reference numbers are used for portions shared with those of the first embodiment described earlier and with reference to FIGS. 8 and 9, and detailed description of such portions is omitted. The processes in steps S1 to S9 are similar to those shown in FIG. 8, and further description thereof is also omitted.

After picking up the environmental noise via the mike 3 in step S9, it is determined in step S31 whether or not the noise canceling functions are on. If it is determined that the noise canceling functions are on, then the process transitions to step S32. In step S32, processing is performed to obtain effects equivalent to the reduction effects obtained when performing noise canceling with respect to the frequency information NS of the noise data NT for the picked-up environmental noise. Frequency information TNS for the noise-reduced environmental noise is thus generated.

In contrast, if it is determined in step S31 that the noise canceling functions are off, then the process transitions to step S33. In step S33, frequency analysis is performed with respect to the noise data NT of the environmental noise that was picked up in step S9, and on the basis of the resulting frequency information NS/TNS, the envelope information NPe/TNPe and power information NPp/TNPp (i.e., the characteristic quantities of the environmental noise) are computed. Subsequently, in step S34, the environmental noise felt by the user is categorized by cross-referencing the envelope information NPe/TNPe and the power information NPp/TNPp thus computed with the characteristic noise quantity database 23.

In step S35, the categorization result for the environmental noise felt by the user is displayed on the display unit 4, and in step S36, a plurality of song category candidates chosen in accordance with the environmental noise categorization result is displayed on the display unit 4. In step S37, a particular song category is selected from among those displayed on the display unit 4 as a result of a user operation performed with respect to the user interface unit 5. In step S38, a particular song is played back from among the songs categorized into the selected song category.

In step S39, it is determined whether or not to continue music playback. If it is determined that music playback is to be continued, then the process returns to step S38, and playback of the current song is continued. When the current song finishes, another song categorized into the same song category is selected and played back.

On the other hand, if it is determined that music playback is to be terminated, then it is subsequently determined in step S40 whether or not to re-analyze the current environmental noise. If it is determined that the environmental noise is to be analyzed, then the process returns to step S9. If it is determined that the environmental noise is not to be analyzed, then the playback apparatus 1 is powered off by the user in step S41, and the above series of processes is terminated.

In addition, the second embodiment described earlier may also be applied to the third embodiment of the present invention. For example, given a playback apparatus having noise canceling functions, a plurality of song category candidates may be selected in accordance with the environmental noise felt by the user. From among the selected plurality of song category candidates, song category candidates with high playback frequencies may be further selected and presented.

As described earlier, if the mike 3 is built into the headphones 2, then the mike 3 picks up the environmental noise felt by the user. For this reason, it is possible to realize the third embodiment by conducting the processing described in the second embodiment and illustrated in FIGS. 5 and 11.

However, if the mike 3 is provided externally to the headphones 2, then the environmental noise felt by the user differs from the environmental noise picked up by the mike 3. For this reason, the processing described in the third embodiment and illustrated in FIGS. 16 and 11 is conducted.

More specifically, if noise canceling functions are on, then the frequency information NS obtained from the noise data NT of the environmental noise picked up by the mike 3 is supplied to the equivalence filter 62 via the switch 61. The equivalence filter 62 then processes the frequency information NS for the noise data NT of the picked-up environmental noise, so as to obtain effects equivalent to those of the noise canceling functions. In so doing, the equivalence filter 62 generates frequency information TNS for the noise-reduced noise data.

On the basis of the frequency information TNS, the envelope analyzer 32 and the power analyzer 33 respectively compute envelope information TNPe and power information TNPp. The noise categorizer 22 then categorizes the environmental noise by cross-referencing the envelope information TNPe and the power information TNPp with the characteristic noise quantity database 23, thereby generating noise category information.

The song category selector 28 then cross-references the noise category information with the song category database 27, selects a plurality of song category candidates suited to the environmental noise felt by the user, and generates song category selection information expressing the selected song categories. The limiter 51 then cross-references the song category selection information with the playback frequency database 52, and limits the selection of playback category candidates expressed by the song category selection information to a predetermined number of song categories (such as two or three, for example) having high playback frequencies.

Figure 18:
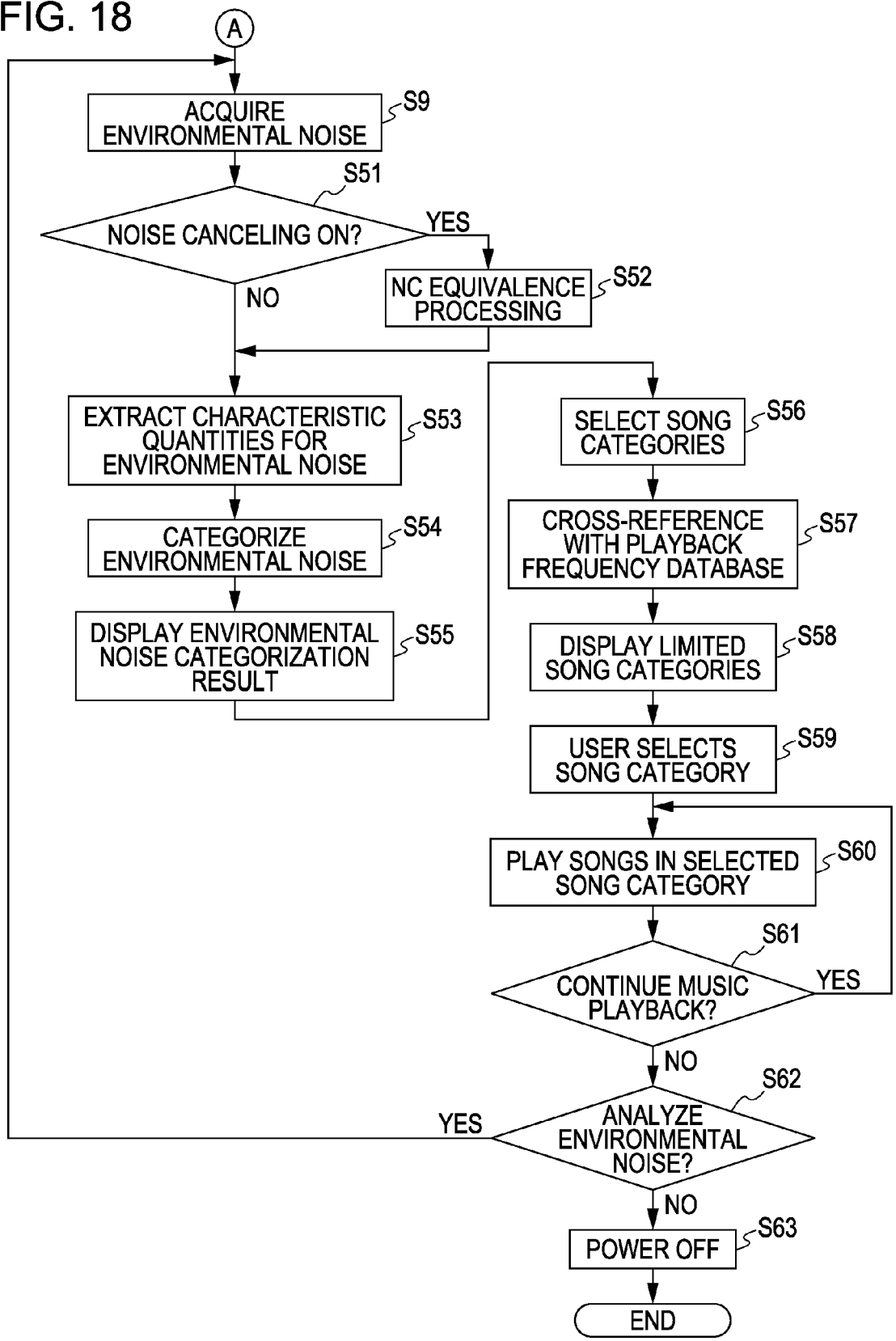
FIG. 18 is a flowchart for explaining a process flow for presenting song categories in the third embodiment of the present invention.

The flowchart shown in FIG. 18 illustrates an exemplary process flow for presenting song categories in the above case. Unless otherwise stated, the processes hereinafter are taken to be controlled by the CPU 11. Furthermore, identical reference numbers are used for portions shared with those of the first embodiment described earlier and with reference to FIGS. 8 and 9, and detailed description of such portions is omitted. The processes in steps S1 to S9 are similar to those shown in FIG. 8, and further description thereof is also omitted.

After picking up the environmental noise via the mike 3 in step S9, it is determined in step S51 whether or not the noise canceling functions are on. If it is determined that the noise canceling functions are on, then the process transitions to step S52. In step S52, the equivalence filter 62 processes the frequency information NS for the noise data NT of the picked-up environmental noise, and frequency information TNS for the noise-reduced environmental noise felt by the user is thus generated.

In contrast, if it is determined in step S51 that the noise canceling functions are off, then the process transitions to step S53. In step S53, frequency analysis is performed with respect to the noise data NT of the environmental noise that was picked up in step S9, and on the basis of the resulting frequency information NS/TNS, the envelope information NPe/TNPe and power information NPp/TNPp (i.e., the characteristic quantities of the environmental noise) are computed. Subsequently, in step S54, the environmental noise felt by the user is categorized by cross-referencing the envelope information NPe/TNPe and the power information NPp/TNPp thus computed with the characteristic noise quantity database 23.

In step S55, the categorization result for the environmental noise felt by the user is displayed on the display unit 4. In step S56, a plurality of song category candidates are selected in accordance with the categorization result, obtained in step S54, for the environmental noise felt by the user. In step S57, the limiter 51 cross-references the song category information expressing the selected plurality of song category candidates with the playback frequency database 52, and limits the selection of song category candidates to a predetermined number of song categories ranked in order of playback frequency. Subsequently, in step S58, the limited selection of song category candidates is displayed on the display unit 4.

In step S59, the user operates the user interface unit 5 to thereby select a particular song category from among those displayed on the display unit 4. In step S60, a particular song is played back from among the songs categorized into the selected song category.

In step S61, it is determined whether or not to continue music playback. If it is determined that music playback is to be continued, then the process returns to step S60, and playback of the current song is continued. When the current song finishes, another song categorized into the same song category is selected and played back.

On the other hand, if it is determined that music playback is to be terminated, then it is subsequently determined in step S62 whether or not to re-analyze the current environmental noise. If it is determined that the environmental noise is to be analyzed, then the process returns to step S9. If it is determined that the environmental noise is not to be analyzed, then the playback apparatus 1 is powered off by the user in step S63, and the above series of processes is terminated.

In this way, in the third embodiment of the present invention, an equivalence filter is used, having reduction effects equivalent to the reduction effects realized by noise canceling functions applied to environmental noise picked up by the mike 3. The environmental noise generated by means of the equivalence filter is then categorized. Subsequently, song category categories suited to the environmental noise felt by the user are presented in accordance with the categorization result. For this reason, a playback apparatus having noise canceling functions is also able to present song category candidates suited to noise-reduced environmental noise.

In addition, the playback apparatus may also be configured to select song category candidates suited to the environmental noise felt by the user, and then display a limited subset of song category candidates that are frequently listened to by the user. In so doing, song categories better suited to the user's preferences can be selected.

The foregoing thus describes a first embodiment, a modification of the first embodiment, as well as second and third embodiments. However, the present invention is not limited to the foregoing embodiments and modification, and various modifications and applications are also possible without departing from the scope and spirit of the present invention. The method for categorizing both environmental noise and songs is not limited to the foregoing examples, and a categorization method of the related art may also be used. In addition, separate categorization methods may be used for the environmental noise and the songs, respectively.

In particular, the foregoing describes a song category having characteristics generally similar to those of the current environmental noise as being an easy-to-hear song category given such environmental noise. However, song categories having characteristics similar to those of the environmental noise are not limited to being easy-to-hear song categories given such environmental noise. It is also conceivable that song categories with dissimilar characteristics are easy to hear, depending on the method for categorizing the environmental noise and the songs. As a more specific example, it is easily conceivable that dissimilarity (i.e., low similarity) between environmental noise and songs reduces the likelihood of the songs being masked by the noise, thus making the songs easy to hear. In other words, the method for selecting song categories suited to the environmental noise may change, depending on the type of characteristic quantities used as evaluation axes.

In addition, although the examples herein describe categorizing songs into "categories" such as "rock" and "classical", the present invention is not limited thereto. For example, the present invention may also be configured to categorize songs into "tempos" expressing song speeds, or into "moods" expressing song melodies, for example.

Furthermore, although songs are described as being the content presented in accordance with environmental noise in the foregoing embodiments of the present invention, the present invention is not limited to such an example. For example, an embodiment of the present invention may also be applied to the case wherein videos are used as the content to be presented.

In this case, song categorization processing similar to that described earlier may be conducted with respect to the audio data portion of videos to thereby extract the characteristic quantities of the audio data and categorize the videos on the basis of the characteristic quantities. The videos may be categorized by genre, such as "Variety Program" or "News Program", for example. It should be appreciated that the method for categorizing videos is not limited to the above, and that other categorization methods may also be used.

Figure 19:
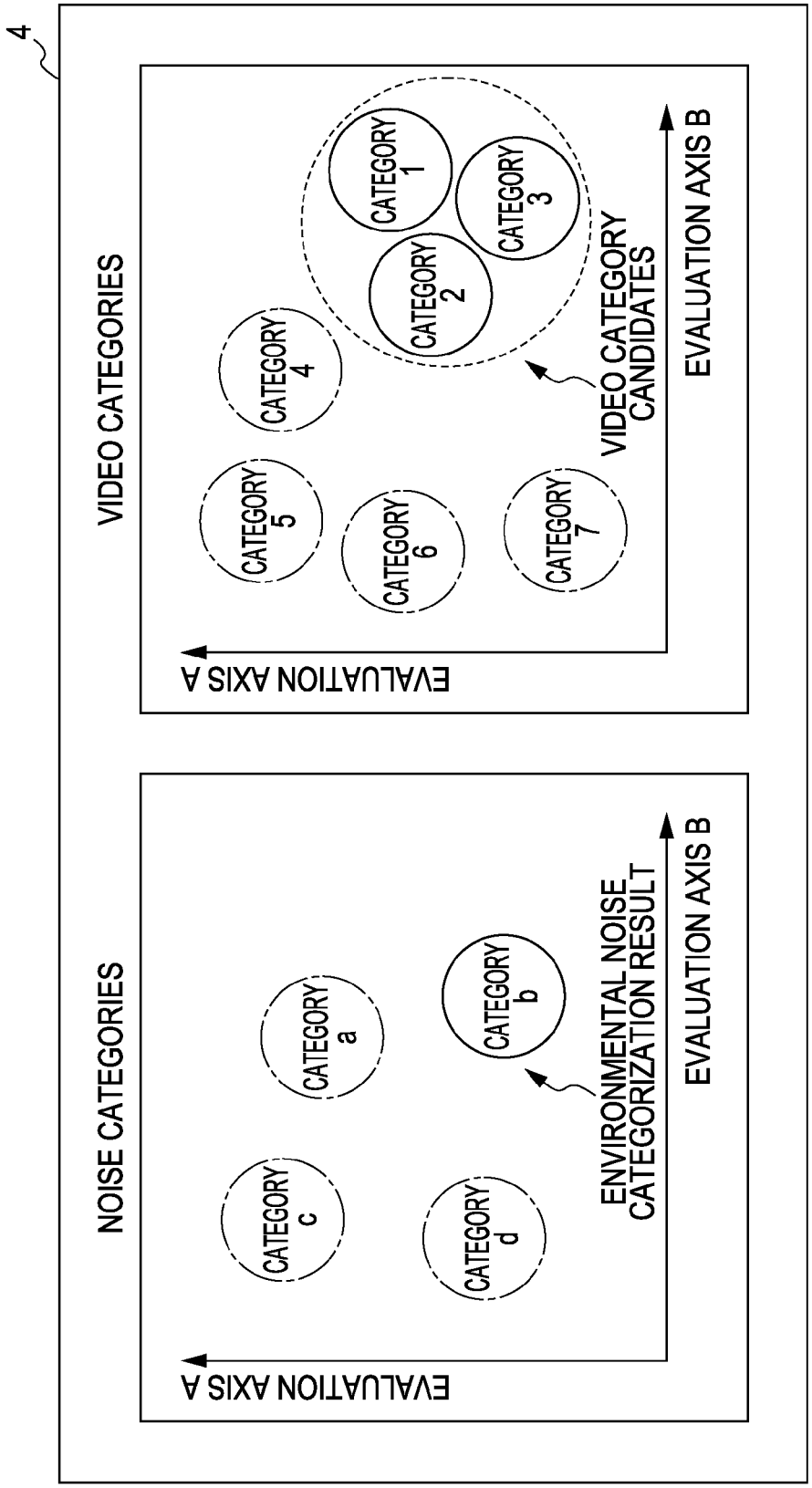
FIG. 19 is a diagram illustrating an exemplary results display of categories suited to the environmental noise, in the case where videos are used as the content.

Subsequently, the environmental noise categorization result as well as video category candidates suited to the current environmental noise are displayed on the display unit 4, as shown in FIG. 19. More specifically, "Variety Program" may be presented as the category result of videos for viewing given environmental noise with a high noise level, for example. "News Program" may be presented given environmental noise with a low noise level.

Furthermore, equalizer characteristics may also be used as the content to be presented. In this case, information such as the low-range power and the high-range power are extracted from the environmental noise as characteristic quantities, for example. The environmental noise is then categorized on the basis of the extracted characteristic quantities. In addition, the low-range boost amount and the high-range boost amount may be extracted from various equalizer characteristics as characteristic quantities. The equalizer characteristics are then categorized on the basis of the extracted characteristic quantities. It should be appreciated that the method for categorizing the equalizer characteristics is not limited to the above, and that other categorization methods may also be applied.

Figure 20:
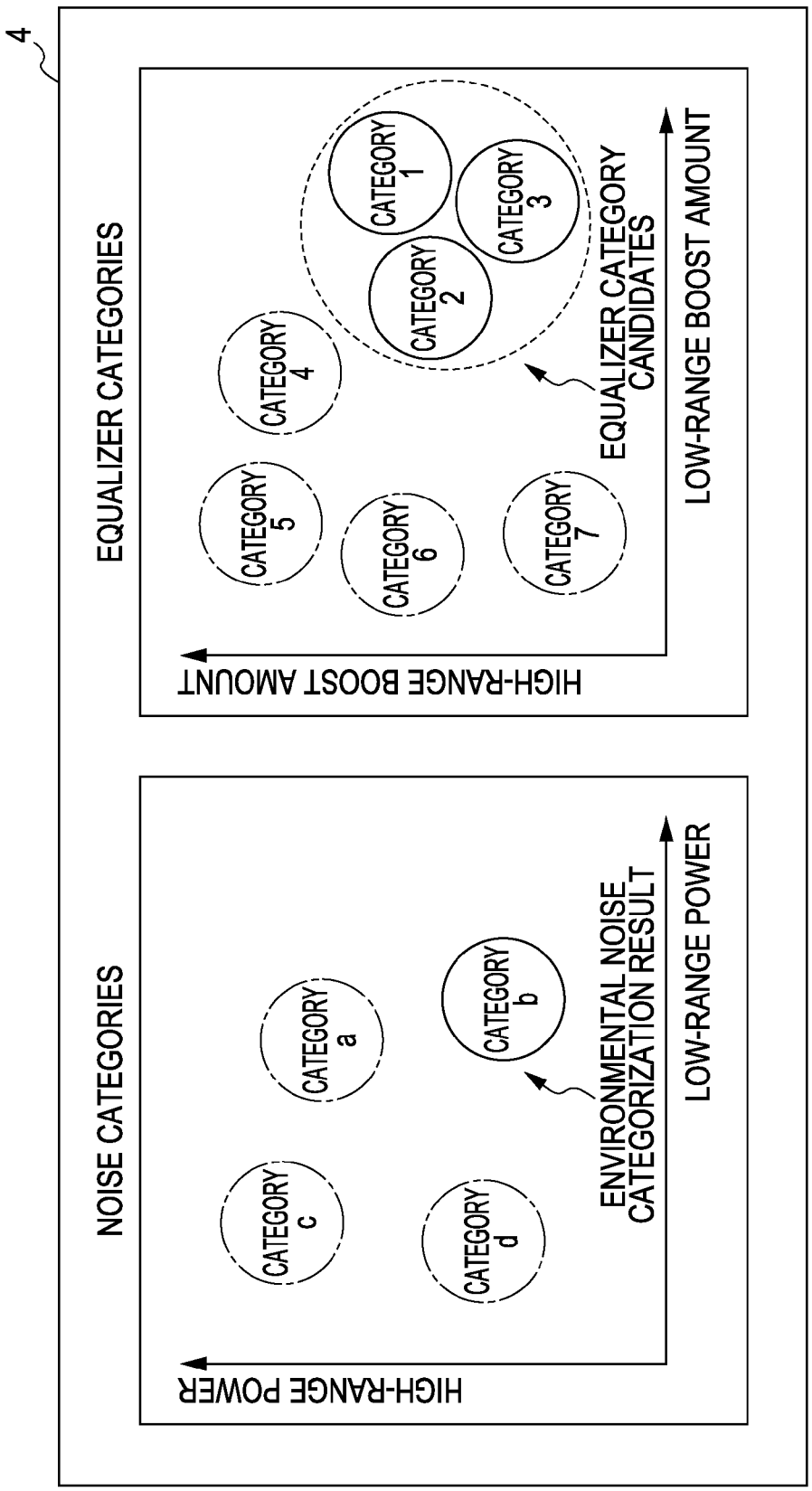
FIG. 20 is a diagram illustrating an exemplary results display of categories suited to the environmental noise, in the case where equalizer characteristics are used as the content.

Subsequently, the environmental noise categorization result as well as equalizer category candidates suited to the current environmental noise are displayed on the display unit 4, as shown in FIG. 20. More specifically, equalizer characteristics having large low-range boost amounts may be presented when given environmental noise wherein energy is concentrated in the lower range, for example. Equalizer characteristics having large high-range boost amounts may be presented when given environmental noise wherein energy is concentrated in the upper range.

Furthermore, it is also possible to use noise canceling characteristics as the content to be presented. In this case, information such as the low-range power and the mid-range power are extracted from the environmental noise as characteristic quantities, for example. The environmental noise is then categorized on the basis of the extracted characteristic quantities. In addition, the low-range canceling amount and the mid-range canceling amount may be extracted from various noise canceling characteristics as characteristic quantities. The noise canceling characteristics are then categorized on the basis of the extracted characteristic quantities. It should be appreciated that the method for categorizing the noise canceling characteristics is not limited to the above, and that other categorization methods may also be applied.

Figure 21:
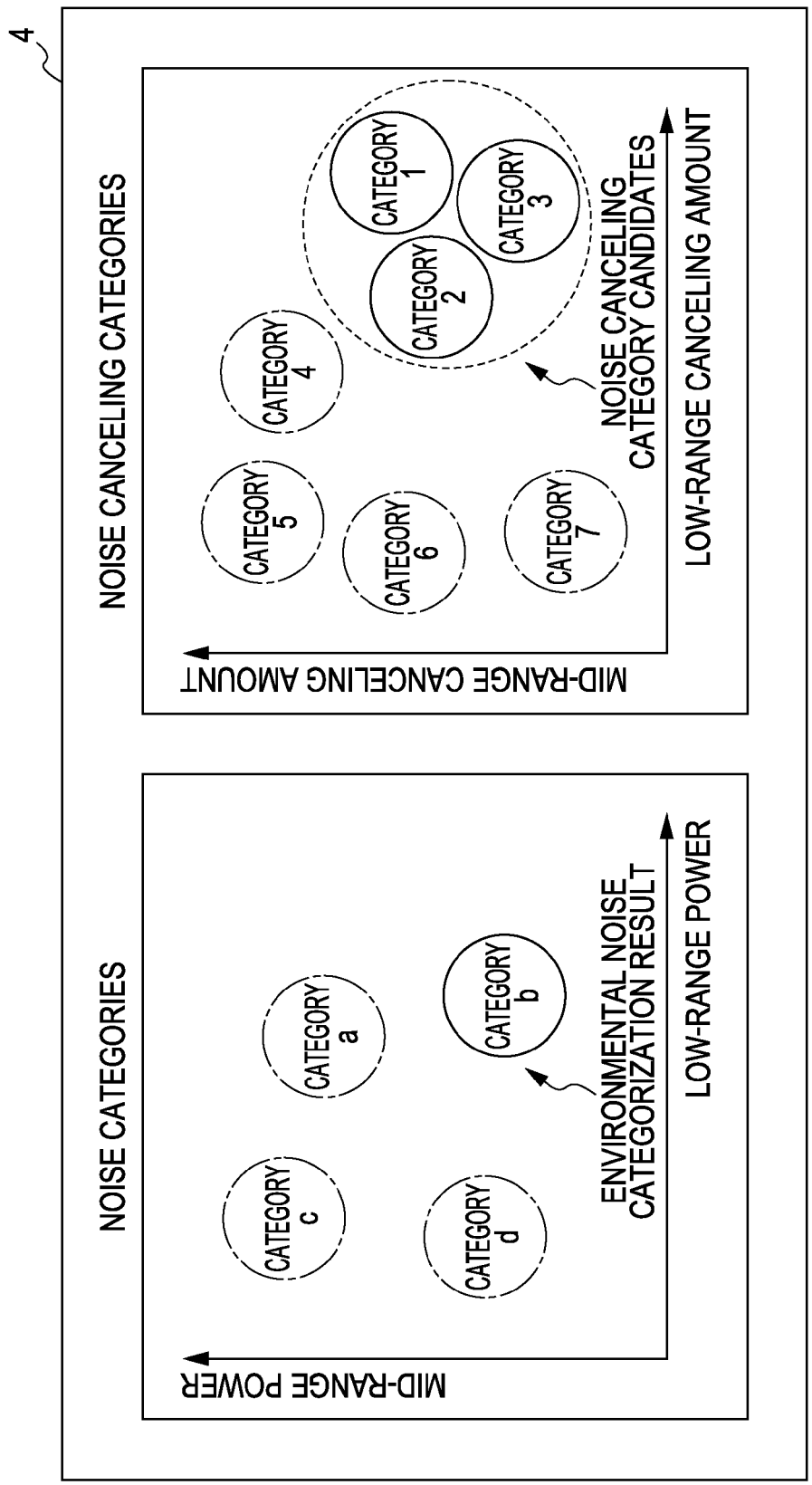
FIG. 21 is a diagram illustrating an exemplary results display of categories suited to the environmental noise, in the case where noise canceling characteristics are used as the content.
Figure 22:
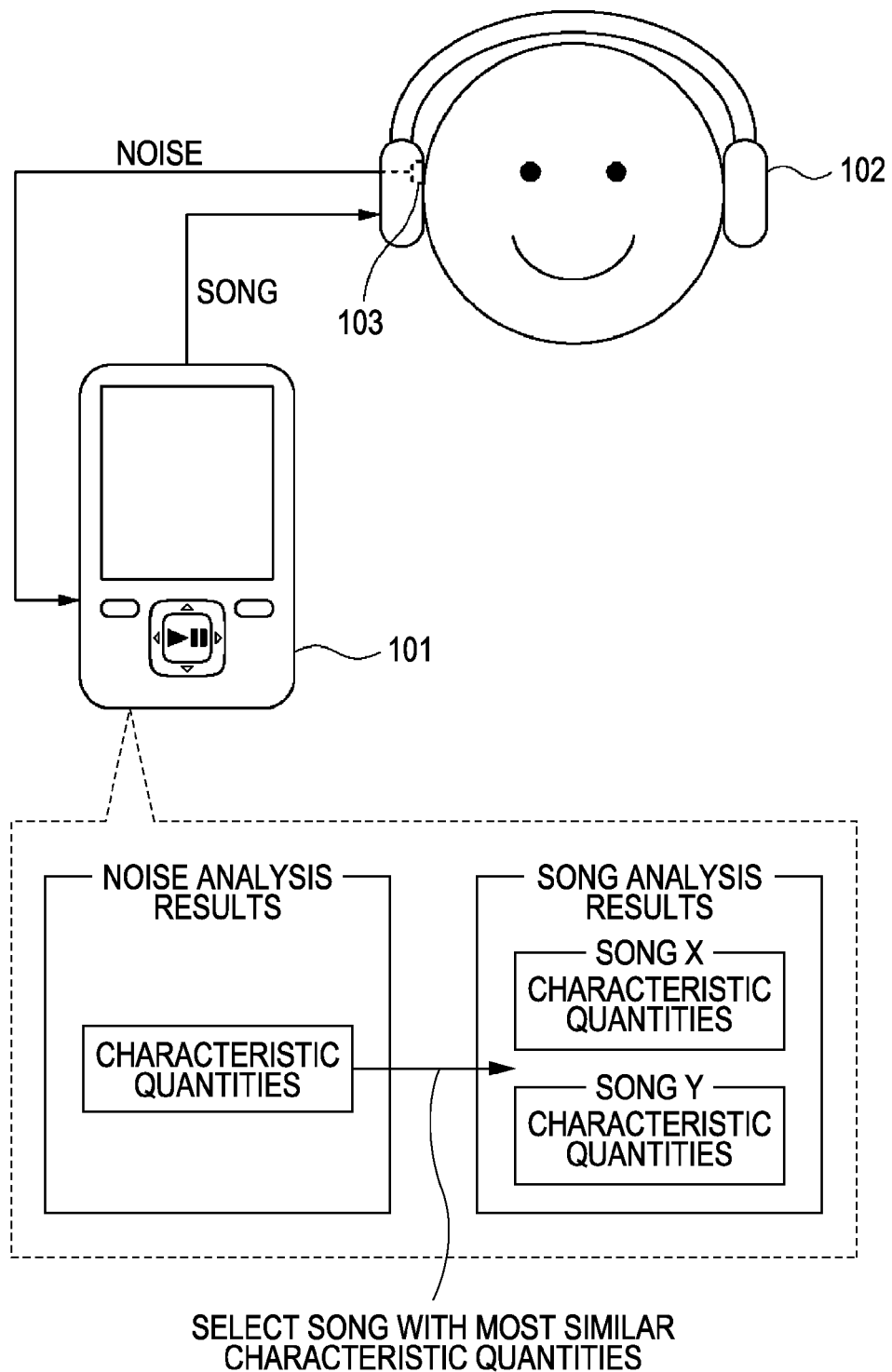
FIG. 22 is a diagram illustrating an exemplary usage of a playback apparatus of the related art.
Figure 23:
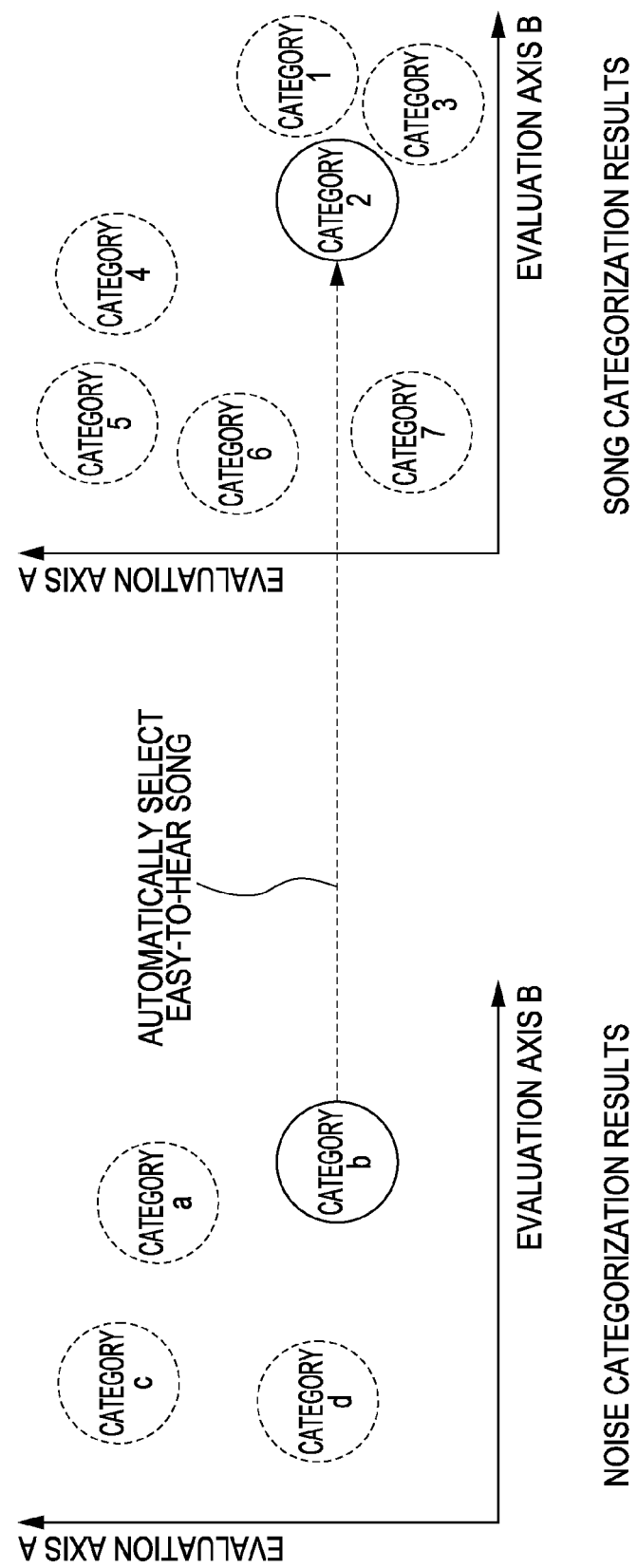
FIG. 23 is a diagram illustrating an exemplary results display of environmental noise and song categories based on two types of characteristic quantities respectively extracted from the environmental noise and the songs.

Subsequently, the environmental noise categorization result as well as noise canceling category candidates suited to the current environmental noise are displayed on the display unit 4, as shown in FIG. 21. More specifically, noise canceling characteristics having large low-range canceling amounts may be presented when given environmental noise wherein energy is concentrated in the lower range, for example. Noise canceling characteristics having large mid-range canceling amounts may be presented when given environmental noise wherein energy is concentrated in the middle range.

The present application contains subject matter related to that disclosed in Japanese Priority Patent Application JP 2008-181037 filed in the Japan Patent Office on Jul. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus, comprising:
    an audio pickup configured to pick up noise data of a surrounding environment;
    a noise analyzer configured to analyze the noise data picked up by the audio pickup and then extract characteristic quantities expressing characteristics of the noise data;
    a noise categorizer configured to categorize the noise data based on the extracted noise data characteristic quantities;
    a content category database configured to store content data recorded onto a recording medium in association with categories based on characteristic quantities of the content data;
    a content category selector configured to cross-reference a noise data categorization result with the content category database, and on a basis thereof, select a plurality of content data categories from among the categorized content data recorded onto the recording medium; and
    a display unit configured to display the selected plurality of content data categories.

2. The playback apparatus according to claim 1, further comprising:
    a user interface unit configured to accept, from a user, an operation to select a particular content data category from among the selected plurality of content data categories displayed on the displayed unit.

3. The playback apparatus according to claim 1, wherein the content category selector selects content data categories by using a similarity between the characteristic quantities of the noise data and the characteristic quantities for categorizing the content data.

4. The playback apparatus according to claim 1, wherein the display unit displays the selected plurality of content data categories on a plane whose axes are the characteristic quantities of the content data.

5. The playback apparatus according to claim 1, wherein the display unit displays the selected plurality of content data categories in a manner that is visually distinguishable from that of other categories.

6. The playback apparatus according to claim 1, wherein the display unit additionally displays the noise data categorization result on a plane whose axes are the characteristic quantities of the noise data.

7. The playback apparatus according to claim 6, wherein the display unit displays the noise data categorization result in a first area separate from a second area in which the selected plurality of content data categories is displayed.

8. The playback apparatus according to claim 6, wherein the display unit displays the noise data categorization result in a same area in which the selected plurality of content data categories is displayed.

9. The playback apparatus according to claim 1, further comprising:
    a playback frequency database configured to store the content data categories in association with playback frequency information based on playback histories of the content data; and
    a limiter configured to cross-reference the playback frequency database, and then limit the selected plurality of content data categories to content data categories having high playback frequencies.

10. The playback apparatus according to claim 1, further comprising:
a noise canceling unit configured to reduce a noise level of the noise data picked up by the audio pickup; wherein
the noise analyzer analyzes noise data whose noise has been reduced by the noise canceling unit.

11. The playback apparatus according to claim 10, further comprising:
an output unit configured to output the content data; wherein
the audio pickup is built into the output unit.

12. The playback apparatus according to claim 10, further comprising:
an output unit configured to output the content data; wherein
the audio pickup is provided externally to the output unit.

13. The playback apparatus according to claim 1, further comprising:
a content analyzer configured to analyze the content data recorded onto the recording medium, and then extract the characteristic quantities of the content data; and
a content categorizer configured to categorize the content data based on the extracted content data characteristic quantities.

14. The playback apparatus according to claim 1, wherein the content data is categorized externally, and then input into the playback apparatus together with information expressing the content data categorization results.

15. The playback apparatus according to claim 1, wherein the content data is song data.

16. The playback apparatus according to claim 1, wherein the content data is video data.

17. The playback apparatus according to claim 1, wherein the content data is equalizer characteristics.

18. The playback apparatus according to claim 1, wherein the content data is noise canceling characteristics.

19. A display method for a playback apparatus, comprising steps of:
picking up noise data of a surrounding environment;
analyzing the noise data picked up in the pickup step, and then extracting characteristic quantities expressing characteristics of the noise data;
categorizing the noise data based on the extracted noise data characteristic quantities;
cross-referencing a noise data categorization result with a content category database that stores content data recorded onto a recording medium in association with categories based on characteristic quantities of the content data, and on a basis thereof, selecting a plurality of content data categories from among the categorized content data recorded onto the recording medium; and
displaying the selected plurality of content data categories on a display unit.

* * * * *